United States Patent
Cohn

(10) Patent No.: US 9,881,276 B2
(45) Date of Patent: Jan. 30, 2018

(54) ULTRASONIC BRACELET AND RECEIVER FOR DETECTING POSITION IN 2D PLANE

(71) Applicant: Amazon Technologies, Inc., Seattle, WA (US)

(72) Inventor: Jonathan Evan Cohn, Winchester, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/083,083

(22) Filed: Mar. 28, 2016

(65) Prior Publication Data
US 2017/0278051 A1  Sep. 28, 2017

(51) Int. Cl.
*G06K 7/10* (2006.01)
*G06Q 10/08* (2012.01)
*G08B 6/00* (2006.01)
*G06K 7/02* (2006.01)

(52) U.S. Cl.
CPC ............ *G06Q 10/087* (2013.01); *G06K 7/02* (2013.01); *G08B 6/00* (2013.01)

(58) Field of Classification Search
USPC .................... 235/385, 492, 487; 705/7.29, 28
See application file for complete search history.

(56) References Cited

U.S. PATENT DOCUMENTS

| | | | |
|---|---|---|---|
| 7,504,949 B1 | 3/2009 | Rouaix et al. | |
| 7,911,324 B2* | 3/2011 | Breed | G01S 13/878 307/10.1 |
| 8,280,547 B2 | 10/2012 | D'Andrea et al. | |
| 9,087,314 B2 | 7/2015 | Hoffman et al. | |
| 9,242,799 B1 | 1/2016 | O'Brien et al. | |
| 2007/0063895 A1* | 3/2007 | August | G06K 7/0008 342/359 |
| 2007/0156312 A1 | 7/2007 | Breed et al. | |
| 2009/0207694 A1* | 8/2009 | Guigne | G01S 5/22 367/127 |
| 2011/0079652 A1* | 4/2011 | Bass | E05B 19/00 235/492 |

(Continued)

OTHER PUBLICATIONS

U.S. Appl. No. 15/083,107, filed Mar. 28, 2016, Titled: Wrist Band Haptic Feedback System.

(Continued)

*Primary Examiner* — Allyson Trail
(74) *Attorney, Agent, or Firm* — Kilpatrick Townsend & Stockton LLP

(57) ABSTRACT

Ultrasonic tracking of a worker's hands may be used to monitor performance of assigned tasks. An inventory system includes inventory bins configured to store inventory items, an ultrasonic unit, ultrasonic transducers, and a management module. The ultrasonic unit is configured to be worn by a user in proximity to the user's hand and to periodically emit ultrasonic sound pulses. The ultrasonic transducers are arranged relative to the inventory bins and configured to receive the emitted pulses. The management module is operatively coupled with the ultrasonic transducers and configured to process signals generated by the ultrasonic transducers to identify an inventory bin based on proximity of the ultrasonic unit relative to the identified inventory bin. The management module monitors performance of an assigned task based on the identified inventory bin.

18 Claims, 13 Drawing Sheets

(56) References Cited

U.S. PATENT DOCUMENTS

| | | | | |
|---|---|---|---|---|
| 2014/0073353 A1* | 3/2014 | Shkedi | ................. | G01S 5/0252 |
| | | | | 455/456.1 |
| 2014/0214631 A1* | 7/2014 | Hansen | ............... | G06Q 10/087 |
| | | | | 705/28 |
| 2015/0081088 A1* | 3/2015 | Lyon | ................. | G06Q 10/0875 |
| | | | | 700/216 |
| 2016/0189174 A1* | 6/2016 | Heath | ............... | G06Q 30/0201 |
| | | | | 705/7.29 |

OTHER PUBLICATIONS

PCT/US2017/022250, International Search Report and Written Opinion, dated Aug. 7, 2017, 13 pages.

Arthaber, H. and K. Witrisal. Presentation [online]. Ranging and Positioning of UHF RFID Tags: RFID Real-Time Localization for Flexible Production Environments (REFlex). Mar. 31, 2016 [retrieved on Jul. 28, 2017]. Retrieved from the Internet: <URL: http://rainrfid.org/wp-content/uploads/2016/03/RAIN-RFID-TUGraz.pdf>, 26 pages.

Witrisal et al, "High-accuracy positioning for indoor applications: RFID, UWB, 5G, and beyond," 2016 *IEEE international Conference on RFID (RFID)*, Orlando, Florida, USA (May 3-5, 2016), 7 pages.

* cited by examiner

ULTRASONIC BRACELET AND RECEIVER FOR DETECTING POSITION IN 2D PLANE

CROSS-REFERENCE TO RELATED APPLICATIONS

This application is related to and incorporates by reference for all purposes the full disclosure of co-pending U.S. patent application Ser. No. 15/083,107, filed Mar. 28, 2016, entitled "WEARABLE HAPTIC FEEDBACK SYSTEM", the contents of which are herein incorporated in its entirety.

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial.

In many inventory systems, an incoming inventory item is typically stored into an inventory bin so as to be quickly retrievable in response to an order for the inventory item. An inventory management system typically stores the identification and location of the inventory bin in which the inventory item is stored for use in locating and processing the inventory item in response to an order for the inventory item. For example, an inventory system worker can pick up the incoming inventory item and place the inventory item into the inventory bin. To keep track of where the inventory item is stored, it is important to efficiently and accurately identify the inventory bin into which the inventory item is placed. Existing approaches for keeping track of where inventory items are stored, however, may require the inventory system worker to perform time consuming acts beyond placing the inventory item into an inventory bin and retrieving the inventory item from the inventory bin, such as pushing a button associated with the inventory bin or scanning a barcode associated with the inventory bin. And while the inventory system worker may be required to perform less time consuming tasks when a computer vision system is used to track placement of the inventory item, such a computer vision system may be computationally intensive and expensive. Accordingly, improved approaches for keeping track of where an inventory item is stored are of interest.

BRIEF DESCRIPTION OF THE DRAWINGS

Various embodiments in accordance with the present disclosure will be described with reference to the drawings, in which.

DETAILED DESCRIPTION

Figure 1:
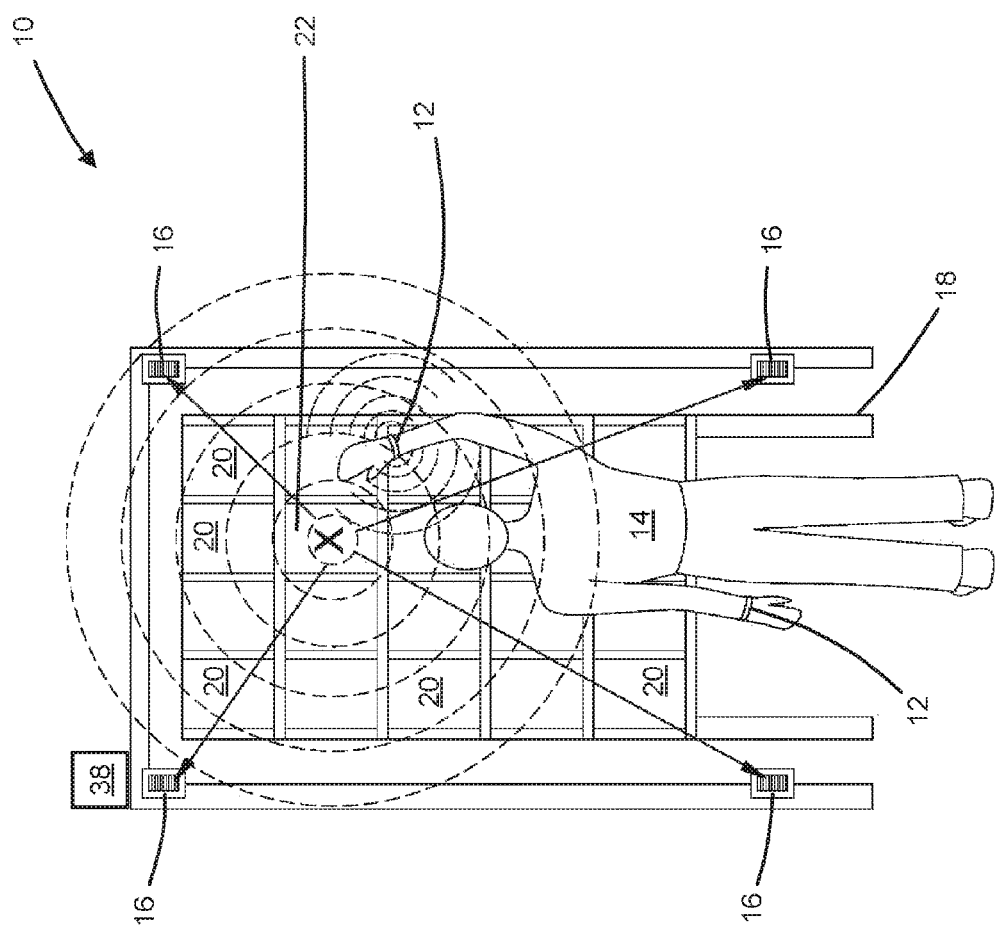
FIG. 1 illustrates an ultrasonic tracking system configured to monitor performance of an inventory system task, in accordance with many embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In many embodiments, an inventory management system includes an ultrasonic based tracking system that tracks movement of one or more hands of an inventory system worker to monitor performance of inventory tasks assigned to the inventory system worker. In many embodiments, the inventory system worker wears one or more ultrasonic pulse emitting units on or adjacent to the inventory system worker's wrist(s) or hand(s). The ultrasonic pulse emitting unit periodically emits ultrasonic pulses at a suitable interval. (e.g., once per second). Ultrasonic transducers are arranged relative to inventory bins and generate signals that are processed to track the location of the ultrasonic pulse emitting units relative to the inventory bins. The locations of the one or more ultrasonic pulse emitting units is used to detect interaction of the inventory system worker with any one of the inventory bins. The detected interaction is used to identify an inventory bin with which the inventory system worker interacted with. In many embodiments, the identified inventory bin is compared with a designated bin to check if the inventory system worker interacted with the correct inventory bin.

For example, the inventory system worker can be instructed to place an inventory item into a particular (designated) inventory bin. By tracking one or both of the inventory system worker's hands via the ultrasonic based tracking system, the bin in which the inventory item is placed can be identified via the tracked locations of the one or more ultrasonic pulse emitting units by detecting when the tracked locations come within a suitable proximity of any particular inventory bin. The identified inventory bin can then be compared with the designated inventory bin to determine if the inventory item is placed in the designated inventory bin or a different inventory bin. Regardless of the identity of the inventory bin in which the inventory item is placed, the inventory management system can use the identity of the inventory bin in which the inventory item is placed to determine suitable subsequent action to be taken based on the actual placement of the inventory item that occurred.

As another example, the inventory system worker can be instructed to retrieve an inventory item from a designated inventory bin. By tracking one or both of the inventory system worker's hands via the ultrasonic based tracking system, the inventory bin from which the inventory item is retrieved can be identified via the tracked locations of the one or more ultrasonic pulse emitting units by detecting when the tracked locations come within a suitable proximity of any particular inventory bin. The identified inventory bin can then be compared with the designated inventory bin to determine if the inventory item was retrieved from the designated inventory bin or a different inventory bin. Regardless of the identity of the inventory bin from which the inventory item was retrieved, the inventory management system can use the identity of the inventory bin from which the inventory item was retrieved to determine suitable subsequent action to be taken based on the actual retrieval of the inventory item that occurred.

Turning now to the drawing figures in which like reference numerals refer to like elements in the various drawing figures, FIG. 1 illustrates an ultrasonic tracking system 10 configured to monitor performance of an inventory system task, in accordance with many embodiments. The ultrasonic tracking system 10 includes one or more ultrasonic units 12 that are worn by an inventory system worker 14 around the worker's wrist(s) or otherwise adjacent to the left hand and/or the right hand of the worker 14. Each of the one or more ultrasonic units 12 periodically emits ultrasonic pulses (e.g., any suitable frequency over 20 kHz) at any suitable interval (e.g., once per second). The ultrasonic tracking system 10 includes a suitable number of ultrasonic transducers 16 that generate electrical signals indicative of the arrival time of the ultrasonic pulses received by the ultrasonic transducers 16. The respective ultrasonic signals generated by the ultrasonic transducers 16 are processed to track the location of the one or more ultrasonic units 12, and thereby track the location of the left hand and/or the right hand of the worker 14. In many embodiments, the ultrasonic tracking system 10 tracks the locations of the worker's left hand and/or right hand to monitor performance of an inventory task assigned to the worker 14, such as placing an inventory item into a designated inventory bin or retrieving an inventory item from a designated inventory bin.

In the embodiment illustrated in FIG. 1, ultrasonic tracking system 10 is configured to track the left hand and/or the right hand of the worker 14 relative to inventory bins of a portable inventory holder 18. The portable inventory holder 18 has a plurality of separate inventory bins 20. In many embodiments, the inventory holder 18 is movable within an inventory facility via a suitable mobile drive unit, such as any of the mobile drive units described herein. In the illustrated embodiment, the four ultrasonic transducers 16 are not mounted to the inventory holder 18. Instead, in the illustrated embodiment, the four transducers 16 are mounted in known locations separate from the inventory holder 18. The inventory holder 18 is controllably placed relative to the four transducers 16 within a suitable positional tolerance (e.g., within three-quarters of an inch). By placing the inventory holder 18 relative to the four transducers 16 within a suitable positional tolerance, each of the inventory bins 20 is thereby placed relative to the four transducers 16 within a suitable positional tolerance.

Each ultrasonic pulse emitted by any particular ultrasonic unit 12 is received by each of the four transducers 16, which generate a respective electrical signal that can be processed to determine the location of the particular ultrasonic unit 12 when the pulse was emitted. In many embodiments, each of the respective electrical signals generated can be processed to identify when the ultrasonic pulse is received by the respective transducer 16 and differences between the arrival times can be used to calculate the location of the particular ultrasonic unit 12 when the pulse was emitted. The resulting time sequence of locations of the particular ultrasonic unit 12 can then be compared to known locations of the inventory bins 20 to detect when the particular ultrasonic unit 12 comes within a suitable proximity of any particular inventory bin 20 corresponding to an interaction between the worker 14 and the particular inventory bin 20.

In many embodiments, the ultrasonic tracking system 10 is used to automatically monitor performance of an inventory tasks assigned to the inventory worker 14. For example, the inventory worker 14 can be instructed to place an inventory item into a designated one of the inventory bins 20, such as into designated inventory bin 22. Because the inventory holder 18 is positioned at a known position relative to the ultrasonic transducers 16, the ultrasonic tracking system 10 can track the location of the worker's 14 left hand and/or right hand relative to the inventory bins 20, including relative to the designated inventory bin 22. The tracked locations can be continually compared to known locations of the inventory bins 20 to detect when the tracked locations come within a designated distance or within a designated volume corresponding to any of the inventory bins 20, including corresponding to the designated inventory bin 22. If such a qualifying proximity is detected, the corresponding inventory bin can be identified and compared to the designated inventory bin 22 into which the inventory item should be placed per instructions to the worker 14. If the identified inventory bin matches the designated inventory bin 22, the ultrasonic tracking system 10 can be configured to proceed based on the assumption that the inventory item has been placed into the designated inventory bin 22. For example, by proceeding based on the assumption that the inventory item has been placed in the designated inventory bin 22, it may be possible to proceed without the worker 14 performing an action that confirms that the inventory item was placed into the designated bin 22, such as via scanning of an identification tag for the designated inventory bin 22. By automatically tracking performance of the assigned inventory task, the ultrasonic tracking system 10 can be used to reduce or eliminate actions performed by the worker 14 to confirm performance of an assigned inventory task. In a similar manner, the ultrasonic tracking system 10 can be used to monitor performance of an inventory task in which the worker 14 is instructed to retrieve an inventory item from a designated one of the inventory bins 20.

In many embodiments, the ultrasonic tracking system 10 is configured to provide feedback to the worker 14 based on the tracked position(s) of the worker's left hand and/or right hand. For example, each of the ultrasonic units 12 can include a haptic feedback mechanism that is controlled to provide suitable haptic feedback to the worker 14 that indicates whether the worker 14 is interacting with the designated inventory bin 22 or another of the inventory bins 20 different from the designated inventory bin 22. Any suitable communication means can be used to transmit a signal to the respective ultrasonic unit 12 indicative of whether the worker 14 is interacting with the designated inventory bin 22 or not. For example, ultrasonic unit 12 can include a communication unit (e.g., a Wi-Fi transceiver, a photo detector to generate a signal in response to a transmitted infra-red signal, an ultrasonic transducer to generate a signal in response to a transmitted ultrasonic pulse) to receive a signal indicative of whether the worker 14 is interacting with the designated inventory bin 22 or another of the inventory bins 20. If a signal is received by the ultrasonic unit 12 that the worker is interacting with the designated inventory bin 22, the ultrasonic unit 12 can control the haptic feedback mechanism to provide a confirmatory haptic feedback to the worker 14. If a signal is received by the ultrasonic unit 12 that the worker 14 is interacting with an inventory bin 20 other than the designated inventory bin 22, the ultrasonic unit 12 can control the haptic feedback mechanism to provide a haptic feedback to the worker 14 indicating that the worker 14 is interacting with an inventory bin 20 other than the designated inventory bin 22.

The ultrasonic tracking system 10 can also be configured to provide guidance feedback to the worker 14 based on the tracked positions of the ultrasonic unit 12. For example, a guidance signal can be transmitted to the ultrasonic unit 12 indicating one or more directions in which the worker 14 should move the worker's respective hand to interact with the designated inventory bin 22. The ultrasonic unit 12 can be configured to control a suitable communication means (e.g., indicator LEDs, a suitable display screen, and/or a haptic feedback mechanism) to communicate to the worker 14 one or more directions to move the worker's respective hand to interact with the designated inventory bin 22.

The ultrasonic tracking system 10 can also be configured to transmit any suitable data from the ultrasonic unit 12. For example, the ultrasonic unit 12 can be configured to embed data into the periodically emitted ultrasonic pulses to communicate any suitable attribute of the ultrasonic unit 12, such as, for example, identification of the worker 14, indication of whether the ultrasonic unit 12 is worn on the left hand or the right hand of the worker 14, a charge state of the ultrasonic unit 12, a timestamp associated with an emitted pulse, an operational status (e.g., any existing faults) of the ultrasonic unit 12 or a duration of use of the ultrasonic unit 12. Alternatively, any other suitable communication approach can be used to communicate any suitable attribute of the ultrasonic unit 12, including via Wi-Fi or infra-red transmission.

The ultrasonic tracking system 10 can include a suitable proximity signal transmitter 38 (e.g., an infra-red LED, a near-field radiofrequency (RF) transmitter) that transmits a proximity signal that can be detected by the ultrasonic unit 12 to trigger emission of the periodic ultrasonic pulses. For example, the ultrasonic unit 12 can have a sleep mode in which the ultrasonic unit 12 does not emit any periodic ultrasonic pulses and an active mode in which the ultrasonic unit 12 does emit the periodic ultrasonic pulses. The ultrasonic unit 12 can include a proximity signal receiver 32 (e.g., photo sensor or cell, near-field RF receiver) to detect a proximity signal (e.g., infra-red light, near-field RF signal) emitted by the proximity signal transmitter 38 and generate a signal indicative of proximity of the ultrasonic unit 12 to the proximity signal transmitter 38 that is used to control whether the ultrasonic unit 12 is placed into the sleep mode or the active mode.

The ultrasonic unit 12 can include a plurality of ultrasonic pulse transmitters distributed around the worker's wrist and/or hand to ensure that each of the ultrasonic transducers 16 has a direct unobstructed path to at least one of the ultrasonic pulse transmitters. In such embodiments, the distribution of the ultrasonic pulse transmitters inhibits and/or prevents blockage of the transmission of the periodic ultrasonic sound pulses to all of the ultrasonic transducers 16.

Figure 2:
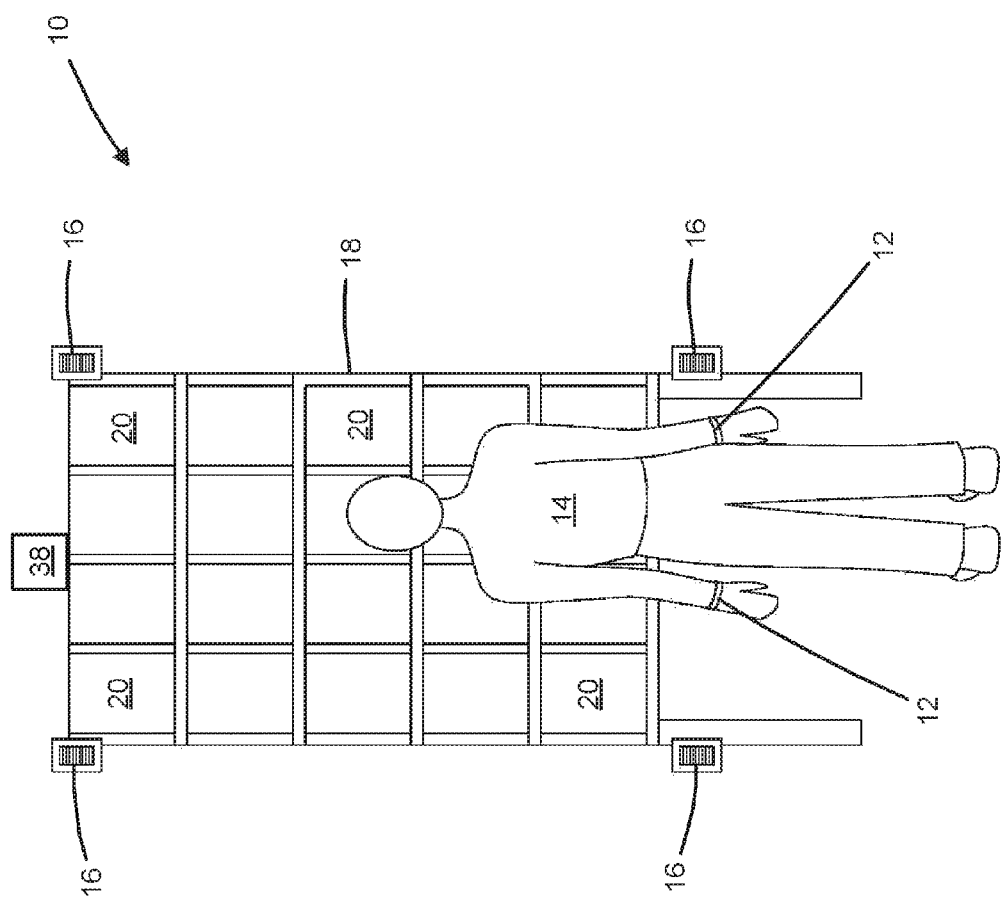
FIG. 2 illustrates a variation of the ultrasonic tracking system of FIG. 1.

FIG. 2 illustrates a variation of the ultrasonic tracking system 10 in which the ultrasonic transducers 16 are mounted to an inventory holder 18 including the inventory bins 20. Such a variation can be used with fixed position or portable inventory holders 18 including inventory bins 20.

Figure 3:
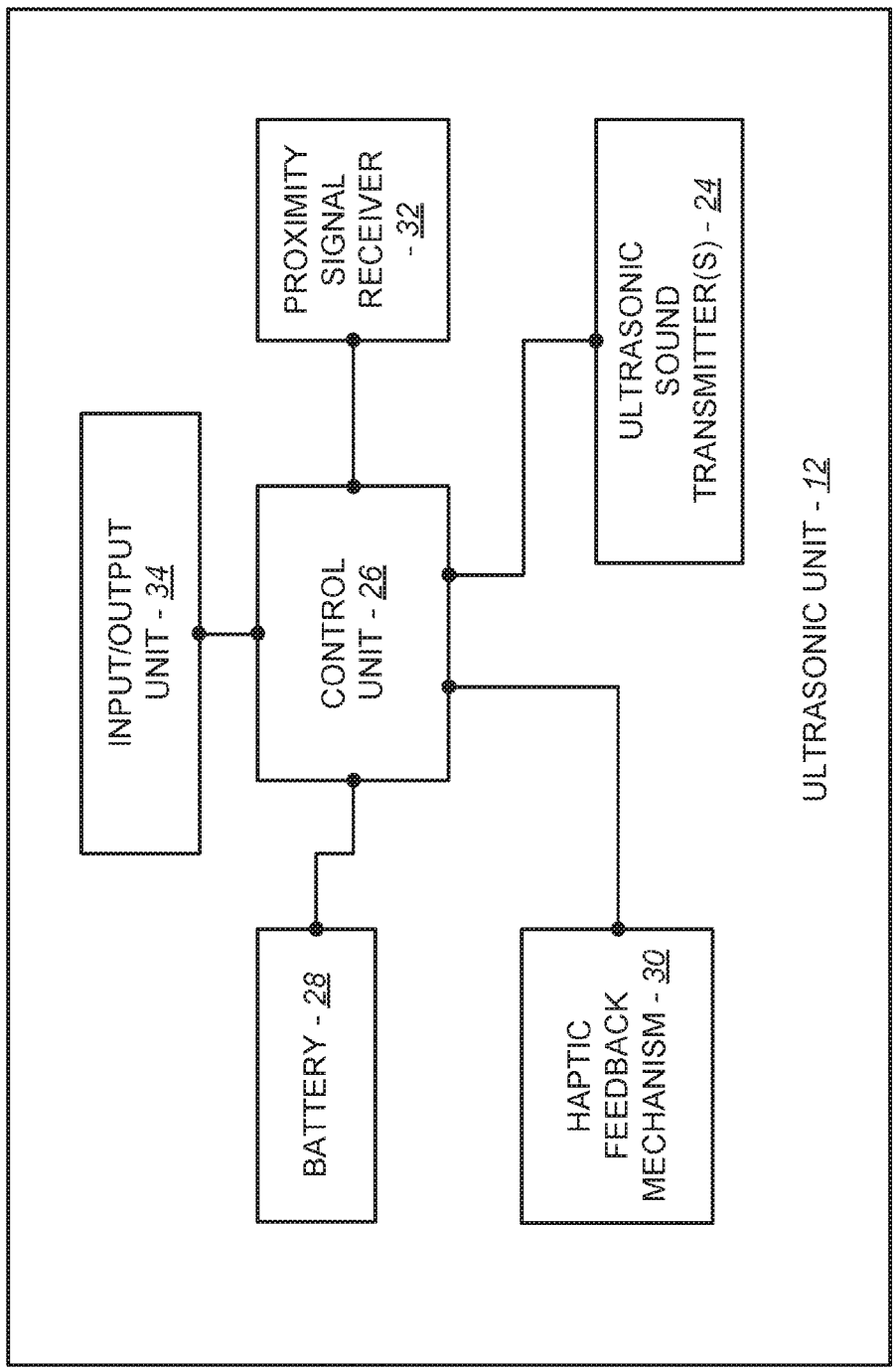
FIG. 3 is a simplified schematic diagram illustrating a user worn ultrasonic unit of an ultrasonic tracking system configured to monitor performance of an inventory system task, in accordance with many embodiments.

FIG. 3 is a simplified schematic diagram illustrating an embodiment of the ultrasonic unit 12. In the illustrated embodiment, the ultrasonic unit 12 includes one or more ultrasonic sound transmitters 24, a control unit 26, a power source (e.g., battery) 28, a haptic feedback mechanism 30, the proximity signal receiver 32, and an input/output unit 34. The control unit 26 is operatively connected to the one or more ultrasonic sound transmitters 24, the battery 28, the haptic feedback mechanism 30, the proximity signal receiver 32, and the input/output unit 34. The control unit 26 can include any suitable electronic components including, but not limited to, a processor, memory, and/or equivalent electronic circuits.

The control unit 26 controls the periodic ultrasonic sound pulses emitted by the one or more ultrasonic sound transmitters 24. For example, in many embodiments the control unit 26 transmits a periodic electric signal to the one or more ultrasonic sound transmitters 24 that is converted into the emitted periodic ultrasonic sound pulses. The control unit 26 can be configured to control the frequency of the emitted pulses so that the emitted ultrasonic sound pulses can be processed to determine any suitable attribute of the ultrasonic unit 12 such as a unique identifier that can be used to identify the worker 14 and/or what hand of the worker 14 on which the ultrasonic unit 12 is worn, a charge state of the ultrasonic unit 12, a timestamp associated with the emitted pulse, an operational status (e.g., any existing faults) of the ultrasonic unit 12 or a duration of use of the ultrasonic unit 12. For example, different ultrasonic frequencies can be used by each of ultrasonic units 12 on the left hand and the right hand to differentiate between the worker's hands. As another example, ultrasonic units 12 used by different workers in nearby stations or at the same station can use different ultrasonic frequencies to differentiate between workers.

In many embodiments, the control unit 26 controls operation of the haptic feedback mechanism 30 to provide haptic feedback to the worker 14 to communicate any one or a plurality of different messages to the worker 14. Each of the different messages can have a unique haptic feedback recognizable by the worker 14. For example, the unique haptic feedbacks can be created by the control unit 26 controlling operation of the feedback mechanism 30 to output haptic feedback having unique combinations of one or more of frequency of output pulses, amplitude of the haptic feedback, haptic feedback with different durations (e.g., long versus short pulses), or unique feedback sequences. For example, the control unit 26 can control the haptic feedback mechanism 30 to provide haptic feedback indicative of whether the worker is interacting with the designated inventory bin 22 or an inventory bin 20 other than the designated inventory bin 22. The haptic feedback can be varied based on the distance from the ultrasonic unit 12 to the designated inventory bin, for example, by varying the frequency of haptic feedback pulses as the distance changes. The control unit 26 can receive an input indicating which of the different messages to communicate to the worker 14. For example, the input can be transmitted to the input/output unit 34 (which can include a suitable communication unit such as a wireless transceiver) or to the proximity signal receiver 32 (e.g., via a suitable infra-red emission, via a suitable RF signal).

The proximity signal receiver 32 is configured to detect the proximity signal (e.g., infra-red light, near-field RF signal) emitted by the proximity signal transmitter 38 and output a signal to the control unit 26 indicative of proximity of the ultrasonic unit 12 to the proximity signal transmitter 38. The control unit 26 can process the signal from the proximity signal receiver 32 to control whether the ultrasonic unit 12 is placed into the sleep mode (in which no ultrasonic pulses are emitted by the ultrasonic unit 12) or the active mode (in which the ultrasonic pulses are emitted by the ultrasonic unit 12). The signal from the proximity signal receiver 32 can also be used by the control unit 26 to inhibit operation of the haptic feedback mechanism 30 when the ultrasonic unit 12 is not within a desired proximity of the proximity signal transmitter 38 and therefore not within a suitable distance of inventory storage locations of interest.

Figure 4:
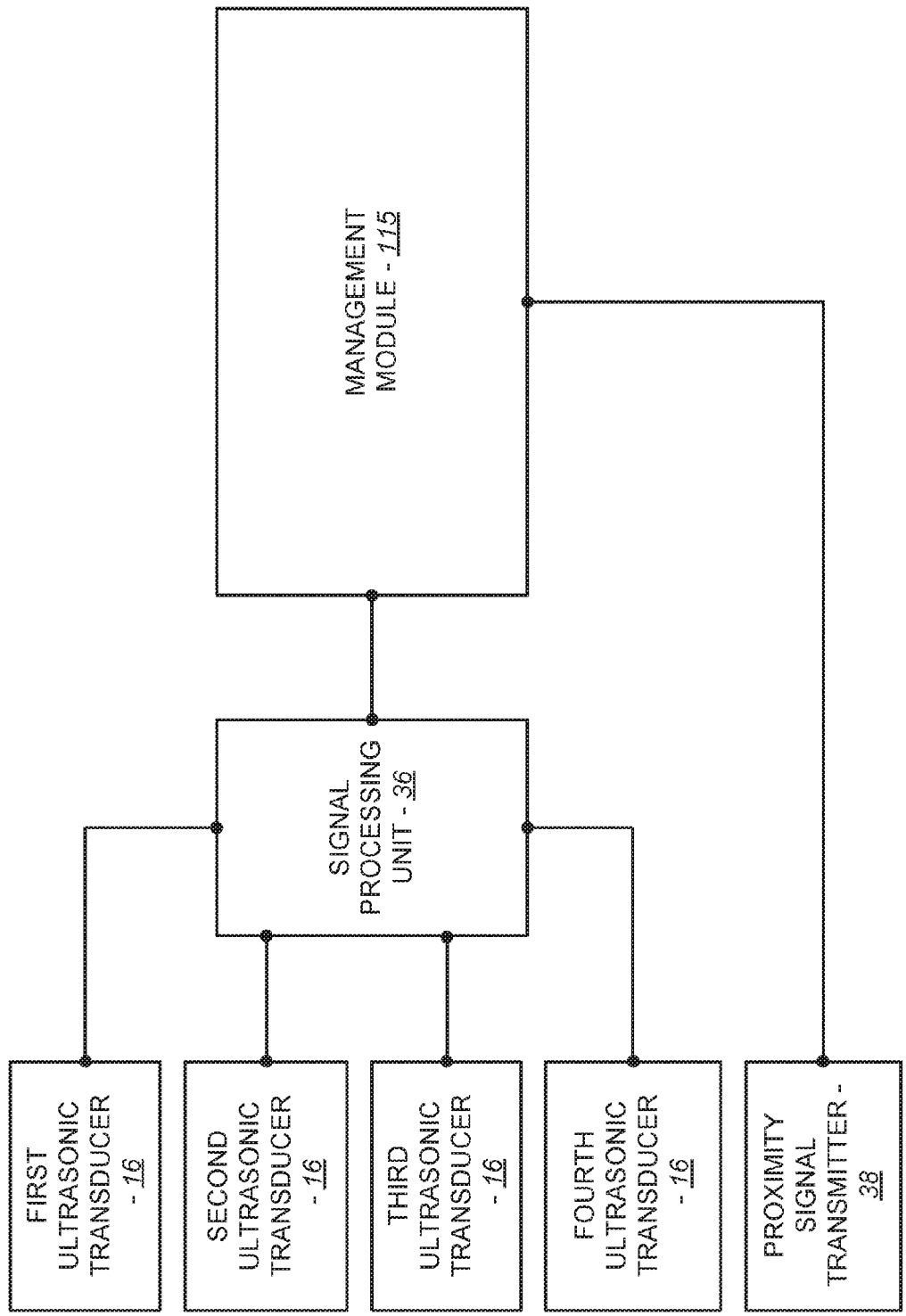
FIG. 4 is a simplified schematic diagram illustrating components of an ultrasonic tracking system configured to monitor performance of an inventory system task, in accordance with many embodiments.

FIG. 4 is a simplified schematic diagram illustrating additional components of the ultrasonic tracking system 10, in accordance with many embodiments. The additional illustrated components include the ultrasonic transducers 16, a signal processing unit 36, a management module 115, and a proximity signal transmitter 38. In many embodiments, the signal processing unit 36 is configured to perform bandwidth filtering to remove noise from the signals generated by the ultrasonic transducers 16 prior to the signals being processed by the management module 115.

In many embodiments, the management module 115 processes the signals generated by the ultrasonic transducers 16 to identify when the respective periodic ultrasonic sound pulses are received by the respective ultrasonic transducers 16 and to compare the respective arrival times to determine and track location of the ultrasonic unit 12. For example, referring to FIG. 1, for the illustrated location of the ultrasonic unit 12 on the worker's 14 right hand, a pulse emitted by the right hand ultrasonic unit 12 will be received first by ultrasonic transducer 16 at the upper right in FIG. 1, will be received second by the ultrasonic transducer 16 at the upper left in FIG. 1, will be received third by the ultrasonic transducer 16 at the lower right in FIG. 1, and will be received last by the ultrasonic transducer 16 at the lower left in FIG. 1. The ultrasonic pulses emitted by the ultrasonic unit 12 can have a frequency low enough to ensure that any particular pulse is received by all of the ultrasonic transducers 16 prior to the emission of the next ultrasonic pulse. The management module 115 can be programmed to determine the three location coordinates (e.g., X, Y, and Z relative to a reference coordinate system) by solving a system of three equations using the resulting three time differentials between when the ultrasonic pulse is first received and when it is received second, third, and fourth by the other ultrasonic transducers 16. Specifically, four equations based on the time of flight between the ultrasonic unit 12 and each of the ultrasonic transducers 16 can be written using the location coordinates (X, Y, Z) of the ultrasonic unit 12, the time that the pulse was emitted (t(0)) by the ultrasonic unit 12, and the known location coordinates of the respective ultrasonic transducer 16. The four equations can then be rewritten to eliminate the variable (t(0)) and the resulting three equations solved by the management module 115 to determine the location of the ultrasonic unit 12 for an emitted pulse. Alternatively, each pulse emitted by the ultrasonic unit 12 can include an embedded time stamp indicating when the pulse was emitted by the ultrasonic unit 12, thereby enabling the use of as few as three ultrasonic transducers 16 to determine the location of the ultrasonic unit 12.

The management module 115 can store data defining respective spatial regions corresponding to each of the inventory bins 20 and evaluate the determined locations of the ultrasonic unit 12 to assess whether the determine location is located within any of the respective spatial regions. If the determined location is found to be within any of the respective spatial regions, the management module 115 can be configured to determine that the worker 14 is interacting with the inventory bin 20 corresponding to the respective spatial region. In many embodiments, the management module 115 is configured to evaluate whether the identified inventory bin 20 matches the designated inventory bin 22, or matches an inventory bin 20 other than the designated inventory bin 22. In many embodiments, the management module 115 is configured to communicate with the ultrasonic unit 12 via a suitable communication mechanism such as those described herein, to indicate, upon occurrence, that the worker 14 is interacting with the designated inventory bin 22 and, upon occurrence, that the worker 14 is interacting with an inventory bin 20 other than the designated inventory bin 22.

In some embodiments, the ultrasonic tracking system 10 includes the proximity signal transmitter 38. The proximity signal transmitter 38 emits a proximity signal that can be received by the ultrasonic unit 12 and indicate when the ultrasonic unit 12 is within an operational proximity to the ultrasonic transducers 16 so that the ultrasonic unit 12 can enter the sleep mode to conserve battery power when the ultrasonic unit 12 is beyond an operational proximity to the ultrasonic transducers 16. In the illustrated embodiment, the management module 115 is operationally coupled with the proximity signal transmitter 38 and configured to control operation of the proximity signal transmitter 38 (e.g., switching the proximity signal transmitter 38 on and off). In alternate embodiments, the proximity signal transmitter 38 is not operationally coupled to the management module 115 and is separately controlled.

Figure 5:
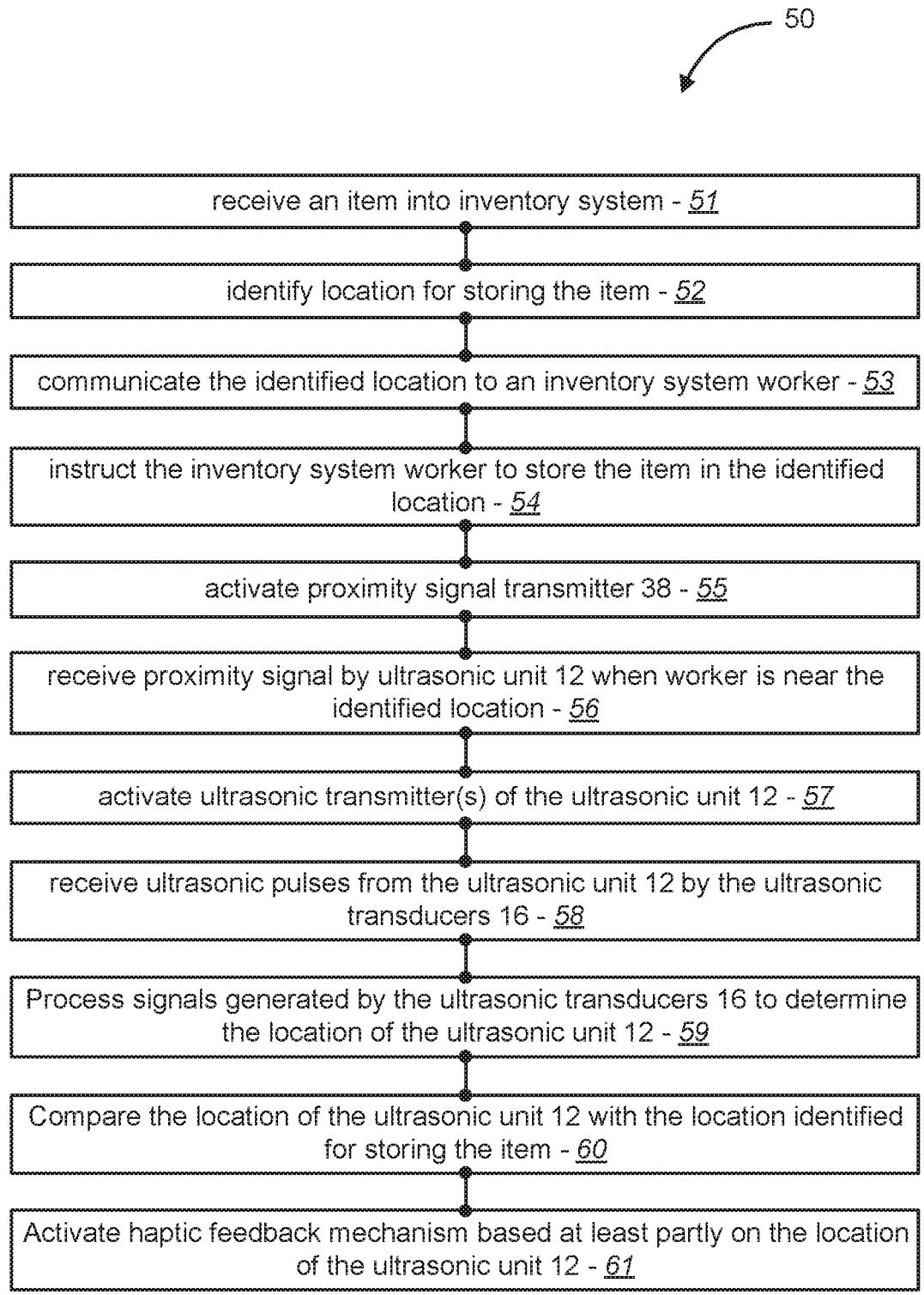
FIG. 5 is a simplified diagram of acts of a method for monitoring accomplishment of storing an incoming item into a storage location in an inventory system by tracking an ultrasonic unit worn by an inventory system worker, in accordance with many embodiments.

FIG. 5 is a simplified diagram of acts of a method 50 for monitoring accomplishment of storing an incoming item into a storage location in an inventory system by tracking an ultrasonic unit worn by an inventory system worker, in accordance with many embodiments. Any suitable ultrasonic tracking system, including the ultrasonic tracking systems described herein, can be used to accomplish the acts of the method 50. The method 50 can be used to provide feedback to the inventory system worker regarding whether the worker is interacting with a designated storage location or not. The method 50 can also be used to detect into which storage location the item is placed by the inventory system worker so that the storage location of the item can be stored in memory for use in locating the item for subsequent retrieval in response to an order for the item. In act 51, an item is received into the inventory system. For example, the item can be included in an incoming shipment of items and identified (e.g., via scanning) during processing of the incoming shipment of items. In act 52, a suitable storage location is identified (e.g., by the management module 115) for storing the item. Possible storage locations that can be identified for storage of the item include, but are not limited to, a particular inventory bin of a movable inventory holder, a worker selected inventory bin of a movable inventory holder, a particular inventory bin of a plurality of fixed inventory bins, or any other suitable storage location. In act 53, the identified storage location is communicated to the system worker. In act 54, the inventory system worker is instructed to store the item in the identified storage location. The identified location for storing the item, and the instruction to store the item in the identified storage location, can be communicated to the inventory system worker in response to detecting that the worker has scanned an identification code associated with the item. Alternatively, the identified storage location for the item can be communicated to the worker in response to detecting that the worker has picked up the item (e.g., via tracking position of the worker's hand(s) via the ultrasonic unit(s) 12 relative to a known position of the item). Any suitable means of communicating the identified storage location to the worker can be used, including, for example, displaying the storage location on a display unit and/or generating haptic feedback via the haptic feedback mechanism of the ultrasonic unit 12.

An ultrasonic tracking system is used to monitor performance of the placing of the incoming inventory item into the identified storage location by the inventory system worker. In act 55, the proximity signal transmitter 38 is activated. The proximity signal transmitter 38 transmits a suitable signal that is receivable by the ultrasonic unit 12 when the ultrasonic unit 12 is within a suitable proximity of the identified storage location, which will be within a suitable proximity of the proximity signal transmitter 38. The ultrasonic tracking system used can include more than one proximity signal transmitter 38 and the proximity signal transmitter 38 to be activated can be selected based on the identified storage location for the item. In act 56, the proximity signal is received by the ultrasonic unit 12 when the worker is near the identified storage location. In response to receiving the proximity signal, the ultrasonic unit 12 activates the ultrasonic transmitter(s) of the ultrasonic unit 12 (act 57). The ultrasonic pulses emitted by the ultrasonic transmitter(s) are received by the ultrasonic transducers 16 (act 58). Signals generated by the ultrasonic transducers 16 in response to reception of the ultrasonic pulses are processed (e.g., via the management module 115) to determine the location of the ultrasonic unit 12 (act 59). The determined location of the ultrasonic unit 12 is compared to the identified storage location for storing the item (act 60). Based on the comparison, the inventory tracking system can make a determination that the item has been stored in the identified storage location. Alternatively, the inventory tracking system can make a determination that the inventory system worker has placed the item into a particular storage location (e.g., different from the identified storage location, or a particular storage location included in the identified storage location when the worker is placing the item to optimize storage efficiency).

In act 61, the haptic feedback mechanism 30 is activated to provide suitable haptic feedback to the inventory system worker based at least partly on the location of the ultrasonic unit 12. For example, the haptic feedback can include one or more of: (a) haptic feedback that the location of the ultrasonic unit 12 is within a suitable close distance to the identified storage location to indicate that the worker is interacting with the identified storage location, (b) haptic feedback that the location of the ultrasonic unit 12 is far enough away from the identified storage location to indicate that the worker is not interacting with the identified storage location, (c) haptic feedback that the location of the ultrasonic unit 12 is within a suitable close distance to a different storage location (other than the identified storage location) to indicate that the worker is interacting with the different storage location or (d) haptic feedback indicative of a distance and/or direction from the ultrasonic unit 12 to the identified storage location.

Figure 6:
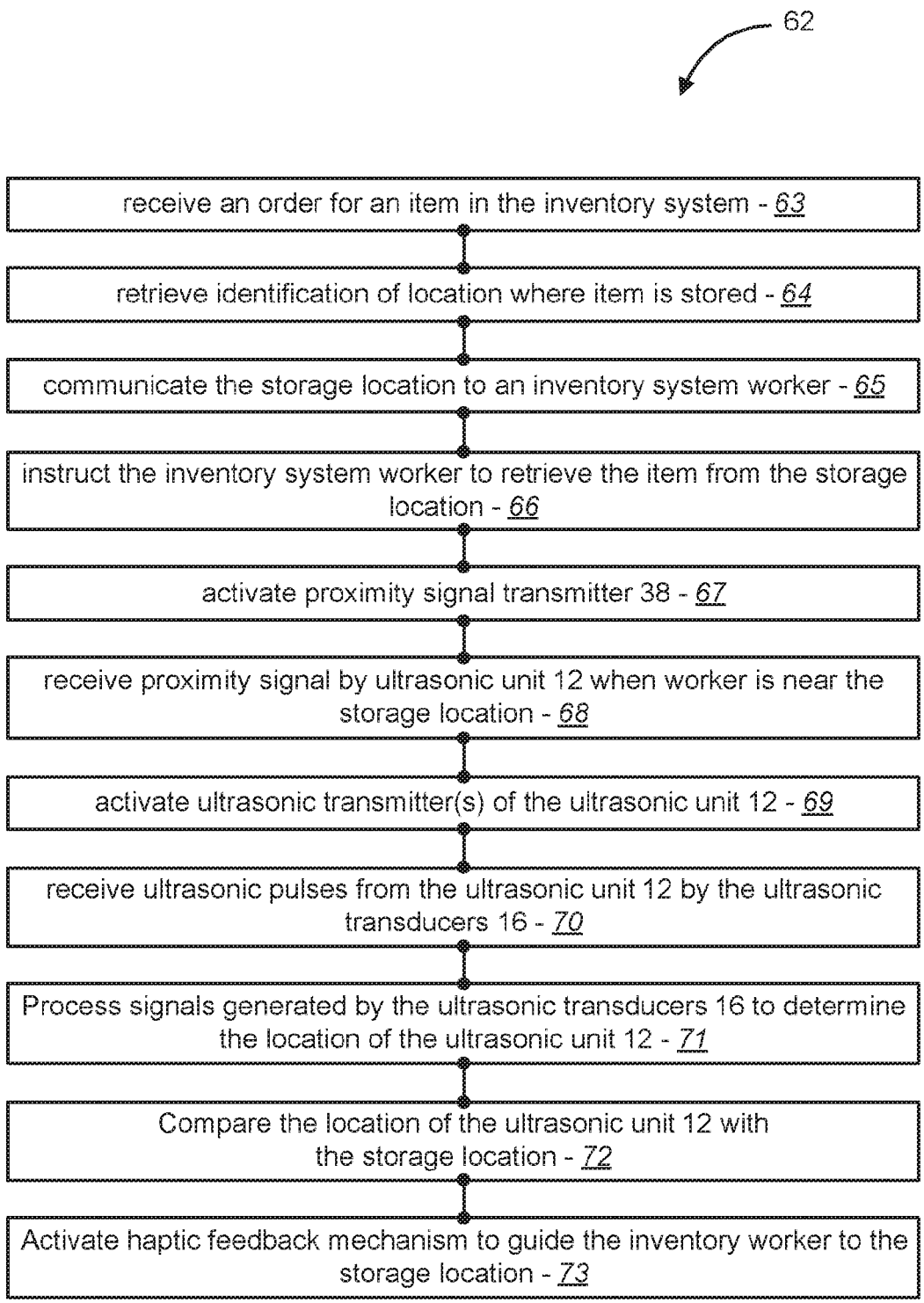
FIG. 6 is a simplified diagram of acts of a method for providing guidance to an inventory system worker during retrieval of an item from a storage location, in accordance with many embodiments.

FIG. 6 is a simplified diagram of acts of a method 62 for monitoring accomplishment of retrieving an item from a storage location (e.g., to prepare the item for shipping to a customer in response to receiving an order for the item) by tracking an ultrasonic unit worn by an inventory system worker, in accordance with many embodiments. Any suitable ultrasonic tracking system, including the ultrasonic tracking systems described herein, can be used to accomplish the acts of the method 62. The method 62 can be used to provide feedback to the inventory system worker regarding whether the worker is interacting with a designated storage location in which the inventory item is stored or not. In act 63, an order is received for an item stored in the inventory system. In act 64, the identification of the storage location in which the item is stored is retrieved from memory (e.g., by the management module 115). In act 65, the storage location is communicated to the inventory system worker. In act 66, the inventory system worker is instructed to retrieve the item from the storage location. The identification of the storage location, and the instruction to retrieve the item from the identified storage location, can be communicated to the inventory system worker via any suitable means, such as via a display unit.

An ultrasonic tracking system is used to monitor performance of the retrieval of the inventory item from the identified storage location by the inventory system worker. In act 67, the proximity signal transmitter 38 is activated. The proximity signal transmitter 38 transmits a suitable signal that is receivable by the ultrasonic unit 12 when the ultrasonic unit 12 is within a suitable proximity of the identified storage location, which will be within a suitable proximity of the proximity signal transmitter 38. The ultrasonic tracking system used can include more than one proximity signal transmitter 38 and the proximity signal transmitter 38 to be activated can be selected based on the identified storage location for the item. In act 68, the proximity signal is received by the ultrasonic unit 12 when the worker is near the identified storage location. In response to receiving the proximity signal, the ultrasonic unit 12 activates the ultrasonic transmitter(s) of the ultrasonic unit 12 (act 69). The ultrasonic pulses emitted by the ultrasonic transmitter(s) are received by the ultrasonic transducers 16 (act 70). Signals generated by the ultrasonic transducers 16 in response to reception of the ultrasonic pulses are processed (e.g., via the management module 115) to determine the location of the ultrasonic unit 12 (act 71). The determined location of the ultrasonic unit 12 is compared to the identified storage location for the item to be retrieved (act 72). Based on the comparison, the inventory tracking system can make a determination that the item has been retrieved from the identified storage location. Alternatively, the inventory tracking system can make a determination that the inventory system worker has retrieved the item from a different storage location.

In act 73, the haptic feedback mechanism 30 is activated to provide suitable haptic feedback to the inventory system worker based at least partly on the location of the ultrasonic unit 12. For example, the haptic feedback can include one or more of: (a) haptic feedback that the location of the ultrasonic unit 12 is within a suitable close distance to the identified storage location in which the item is stored to indicate that the worker is interacting with the identified storage location, (b) haptic feedback that the location of the ultrasonic unit 12 is far enough away from the identified storage location to indicate that the worker is not interacting with the identified storage location, (c) haptic feedback that the location of the ultrasonic unit 12 is within a suitable close distance to a different storage location (other than the identified storage location) to indicate that the worker is interacting with the different storage location or (d) haptic feedback indicative of a distance and/or direction from the ultrasonic unit 12 to the identified storage location.

Figure 7:
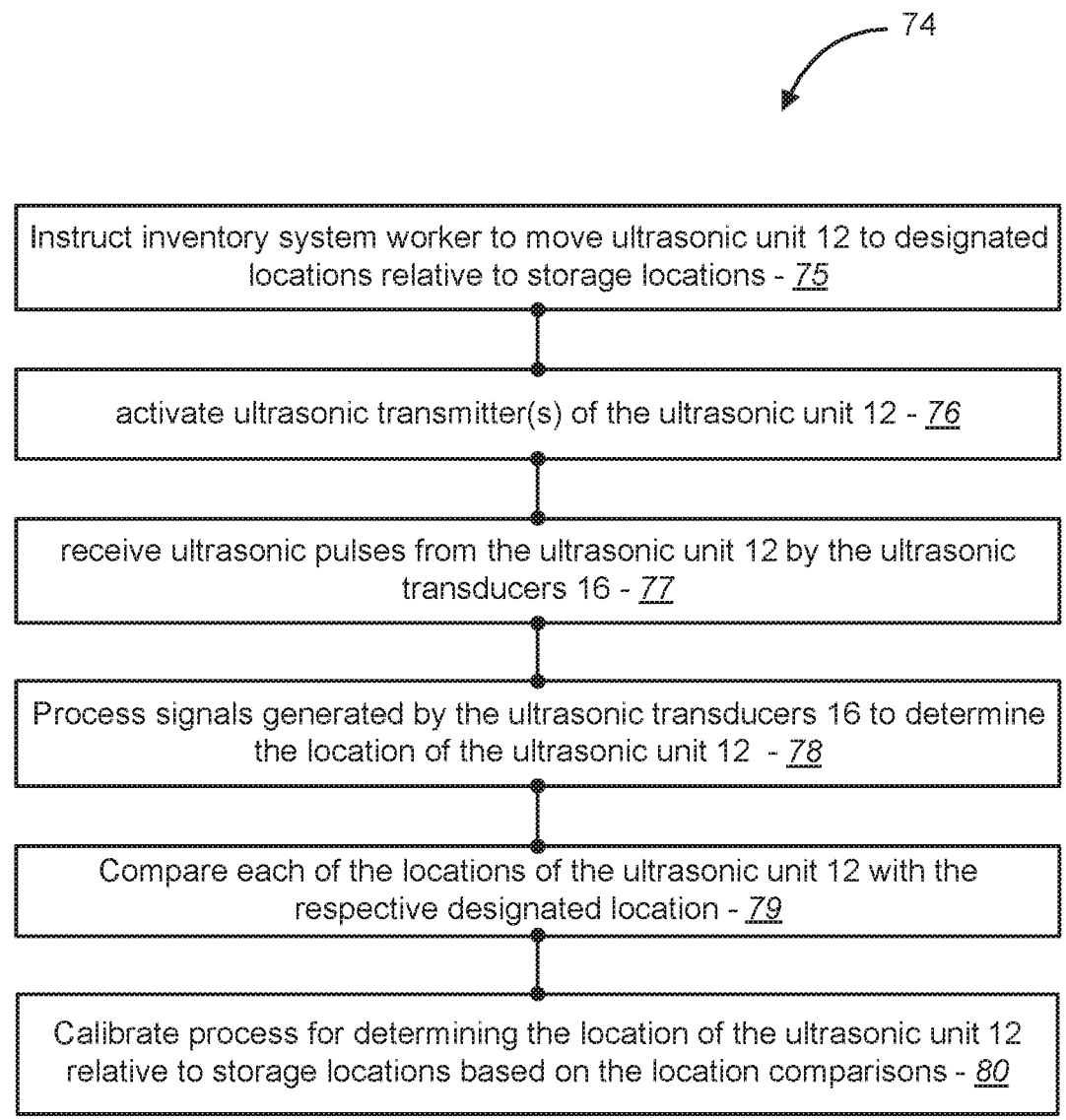
FIG. 7 is a simplified diagram of acts of a method for calibrating an ultrasonic tracking system, in accordance with many embodiments.

FIG. 7 is a simplified diagram of acts of a method 74 for calibrating an ultrasonic tracking system, in accordance with many embodiments. Any suitable ultrasonic tracking system, including the ultrasonic tracking systems described herein, can be used to accomplish the acts of the method 74. The method 74 can be used to calibrate tracked locations of the ultrasonic unit(s) 12 relative to known locations and/or to known storage locations within an inventory system. In act 75, an inventory system worker is instructed to move the ultrasonic unit(s) 12 to designated locations relative to storage locations. In act 76, an ultrasonic transmitter(s) of the ultrasonic unit 12 is activated. In act 77, ultrasonic pulses from the ultrasonic unit 12 are received by the ultrasonic transducers 16. In act 78, signals generated by the ultrasonic transducers 16 are processed (e.g., by the management module 115) to determine the location of the ultrasonic unit 12. In act 79, each of the locations of the ultrasonic unit 12 is compared with the respective designated location. In act 80, the process for determining the location of the ultrasonic unit 12 relative to storage locations is calibrated based on the location comparisons.

Example Implementation—Inventory Management System

Figure 8:
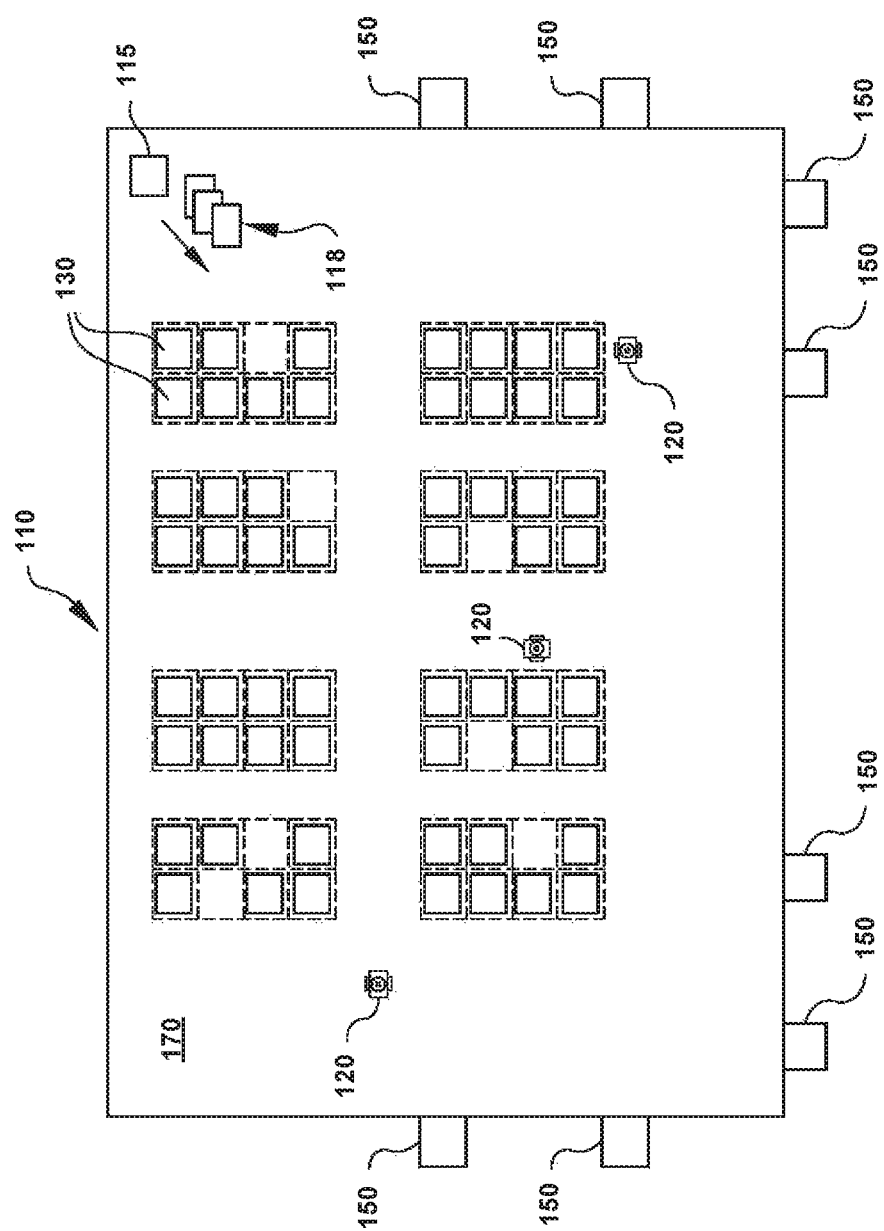
FIG. 8 illustrates components of an inventory system in which an ultrasonic tracking system configured to monitor performance of an inventory system task can be implemented, in accordance with many embodiments.

FIG. 8 illustrates the contents of an inventory system 110. Inventory system 110 includes a management module 115, one or more mobile drive units 120, one or more inventory holders 130, and one or more inventory stations 150. Mobile drive units 120 transport inventory holders 130 between points within a workspace 170 in response to commands communicated by management module 115. Each inventory holder 130 stores one or more types of inventory items. As a result, inventory system 110 is capable of moving inventory items between locations within workspace 170 to facilitate the entry, processing, and/or removal of inventory items from inventory system 110 and the completion of other tasks involving inventory items.

Management module 115 assigns tasks to appropriate components of inventory system 110 and coordinates operation of the various components in completing the tasks. These tasks may relate not only to the movement and processing of inventory items, but also to the management and maintenance of the components of inventory system 110. For example, management module 115 may assign portions of workspace 170 as parking spaces for mobile drive units 120, the scheduled recharge or replacement of mobile drive unit batteries, the storage of empty inventory holders 130, or any other operations associated with the functionality supported by inventory system 110 and its various components. Management module 115 may select components of inventory system 110 to perform these tasks and communicate appropriate commands and/or data to the selected components to facilitate completion of these operations. Although shown in FIG. 8 as a single, discrete component, management module 115 may represent multiple components and may represent or include portions of mobile drive units 120 or other elements of inventory system 110. As a result, any or all of the interaction between a particular mobile drive unit 120 and management module 115 that is described below may, in particular embodiments, represent peer-to-peer communication between that mobile drive unit 120 and one or more other mobile drive units 120.

Mobile drive units 120 move inventory holders 130 between locations within workspace 170. Mobile drive units 120 may represent any devices or components appropriate for use in inventory system 110 based on the characteristics and configuration of inventory holders 130 and/or other elements of inventory system 110. In a particular embodiment of inventory system 110, mobile drive units 120 represent independent, self-powered devices configured to freely move about workspace 170. Examples of such inventory systems are disclosed in U.S. Pat. No. 9,087,314, issued Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 120 represent elements of a tracked inventory system configured to move inventory holder 130 along tracks, rails, cables, crane system, or other guidance or support elements traversing workspace 170. In such an embodiment, mobile drive units 120 may receive power and/or support through a connection to the guidance elements, such as a powered rail. Additionally, in particular embodiments of inventory system 110 mobile drive units 120 may be configured to utilize alternative conveyance equipment to move within workspace 170 and/or between separate portions of workspace 170. The contents and operation of an example embodiment of a mobile drive unit 120 are discussed further below with respect to FIGS. 10 through 12.

Additionally, mobile drive units 120 may be capable of communicating with management module 115 to receive information identifying selected inventory holders 130, transmit the locations of mobile drive units 120, or exchange any other suitable information to be used by management module 115 or mobile drive units 120 during operation. Mobile drive units 120 may communicate with management module 115 wirelessly, using wired connections between mobile drive units 120 and management module 115, and/or in any other appropriate manner. As one example, particular embodiments of mobile drive unit 120 may communicate with management module 115 and/or with one another using 802.11, Bluetooth, or Infrared Data Association (IrDA) standards, or any other appropriate wireless communication protocol. As another example, in a tracked inventory system 110, tracks or other guidance elements upon which mobile drive units 120 move may be wired to facilitate communication between mobile drive units 120 and other components of inventory system 110. Furthermore, as noted above, management module 115 may include components of individual mobile drive units 120. Thus, for the purposes of this description and the claims that follow, communication between management module 115 and a particular mobile drive unit 120 may represent communication between components of a particular mobile drive unit 120. In general, mobile drive units 120 may be powered, propelled, and controlled in any manner appropriate based on the configuration and characteristics of inventory system 110.

Inventory holders 130 store inventory items. In a particular embodiment, inventory holders 130 include multiple storage bins with each storage bin capable of holding one or more types of inventory items. Inventory holders 130 are capable of being carried, rolled, and/or otherwise moved by mobile drive units 120. In particular embodiments, inventory holder 130 may provide additional propulsion to supplement that provided by mobile drive unit 120 when moving inventory holder 130.

Additionally, in particular embodiments, inventory items may also hang from hooks or bars (not shown) within or on inventory holder 130. In general, inventory holder 130 may store inventory items in any appropriate manner within inventory holder 130 and/or on the external surface of inventory holder 130.

Additionally, each inventory holder 130 may include a plurality of faces, and each bin may be accessible through one or more faces of the inventory holder 130. For example, in a particular embodiment, inventory holder 130 includes four faces. In such an embodiment, bins located at a corner of two faces may be accessible through either of those two faces, while each of the other bins is accessible through an opening in one of the four faces. Mobile drive unit 120 may be configured to rotate inventory holder 130 at appropriate times to present a particular face and the bins associated with that face to an operator or other components of inventory system 110.

Inventory items represent any objects suitable for storage, retrieval, and/or processing in an automated inventory system 110. For the purposes of this description, "inventory items" may represent any one or more objects of a particular type that are stored in inventory system 110. Thus, a particular inventory holder 130 is currently "storing" a particular inventory item if the inventory holder 130 currently holds one or more units of that type. As one example, inventory system 110 may represent a mail order warehouse facility, and inventory items may represent merchandise stored in the warehouse facility. During operation, mobile drive units 120 may retrieve inventory holders 130 containing one or more inventory items requested in an order to be packed for delivery to a customer or inventory holders 130 carrying pallets containing aggregated collections of inventory items for shipment. Moreover, in particular embodiments of inventory system 110, boxes containing completed orders may themselves represent inventory items.

In particular embodiments, inventory system 110 may also include one or more inventory stations 150. Inventory stations 150 represent locations designated for the completion of particular tasks involving inventory items. Such tasks may include the removal of inventory items from inventory holders 130, the introduction of inventory items into inventory holders 130, the counting of inventory items in inventory holders 130, the decomposition of inventory items (e.g., from pallet- or case-sized groups to individual inventory items), the consolidation of inventory items between inventory holders 130, and/or the processing or handling of inventory items in any other suitable manner. In particular embodiments, inventory stations 150 may just represent the physical locations where a particular task involving inventory items can be completed within workspace 170. In alternative embodiments, inventory stations 150 may represent both the physical location and also any appropriate equipment for processing or handling inventory items, such as scanners for monitoring the flow of inventory items in and out of inventory system 110, communication interfaces for communicating with management module 115, and/or any other suitable components. Inventory stations 150 may be controlled, entirely or in part, by human operators or may be fully automated. Moreover, the human or automated operators of inventory stations 150 may be capable of performing certain tasks to inventory items, such as packing, counting, or transferring inventory items, as part of the operation of inventory system 110.

Workspace 170 represents an area associated with inventory system 110 in which mobile drive units 120 can move and/or inventory holders 130 can be stored. For example, workspace 170 may represent all or part of the floor of a mail-order warehouse in which inventory system 110 operates. In some embodiments, workspace 170 includes multiple floors, and some combination of ramps, elevators, conveyors, and/or other devices are provided to facilitate movement of mobile drive units 120 and/or other components of the inventory system 110 between the multiple floors. Although FIG. 8 shows, for the purposes of illustration, an embodiment of inventory system 110 in which workspace 170 includes a fixed, predetermined, and finite physical space, particular embodiments of inventory system 110 may include mobile drive units 120 and inventory holders 130 that are configured to operate within a workspace 170 that is of variable dimensions and/or an arbitrary geometry. While FIG. 8 illustrates a particular embodiment of inventory system 110 in which workspace 170 is entirely enclosed in a building, alternative embodiments may utilize workspaces 170 in which some or all of the workspace 170 is located outdoors, within a vehicle (such as a cargo ship), or otherwise unconstrained by any fixed structure.

In operation, management module 115 selects appropriate components to complete particular tasks and transmits task assignments 118 to the selected components to trigger completion of the relevant tasks. Each task assignment 118 defines one or more tasks to be completed by a particular component. These tasks may relate to the retrieval, storage, replenishment, and counting of inventory items and/or the management of mobile drive units 120, inventory holders 130, inventory stations 150 and other components of inventory system 110. Depending on the component and the task to be completed, a particular task assignment 118 may identify locations, components, and/or actions associated with the corresponding task and/or any other appropriate information to be used by the relevant component in completing the assigned task.

In particular embodiments, management module 115 generates task assignments 118 based, in part, on inventory requests that management module 115 receives from other components of inventory system 110 and/or from external components in communication with management module 115. These inventory requests identify particular operations to be completed involving inventory items stored or to be stored within inventory system 110 and may represent communication of any suitable form. For example, in particular embodiments, an inventory request may represent a shipping order specifying particular inventory items that have been purchased by a customer and that are to be retrieved from inventory system 110 for shipment to the customer. Management module 115 may also generate task assignments 118 independently of such inventory requests, as part of the overall management and maintenance of inventory system 110. For example, management module 115 may generate task assignments 118 in response to the occurrence of a particular event (e.g., in response to a mobile drive unit 120 requesting a space to park), according to a predetermined schedule (e.g., as part of a daily start-up routine), or at any appropriate time based on the configuration and characteristics of inventory system 110. After generating one or more task assignments 118, management module 115 transmits the generated task assignments 118 to appropriate components for completion of the corresponding task. The relevant components then execute their assigned tasks.

With respect to mobile drive units 120 specifically, management module 115 may, in particular embodiments, communicate task assignments 118 to selected mobile drive units 120 that identify one or more destinations for the selected mobile drive units 120. Management module 115 may select a mobile drive unit 120 to assign the relevant task based on the location or state of the selected mobile drive unit 120, an indication that the selected mobile drive unit 120 has completed a previously-assigned task, a predetermined schedule, and/or any other suitable consideration. These destinations may be associated with an inventory request the management module 115 is executing or a management objective the management module 115 is attempting to fulfill. For example, the task assignment may define the location of an inventory holder 130 to be retrieved, an inventory station 150 to be visited, a storage location where the mobile drive unit 120 should park until receiving another task, or a location associated with any other task appropriate based on the configuration, characteristics, and/or state of inventory system 110, as a whole, or individual components of inventory system 110. For example, in particular embodiments, such decisions may be based on the popularity of particular inventory items, the staffing of a particular inventory station 150, the tasks currently assigned to a particular mobile drive unit 120, and/or any other appropriate considerations.

As part of completing these tasks mobile drive units 120 may dock with and transport inventory holders 130 within workspace 170. Mobile drive units 120 may dock with inventory holders 130 by connecting to, lifting, and/or otherwise interacting with inventory holders 130 in any other suitable manner so that, when docked, mobile drive units 120 are coupled to and/or support inventory holders 130 and can move inventory holders 130 within workspace 170. While the description below focuses on particular embodiments of mobile drive unit 120 and inventory holder 130 that are configured to dock in a particular manner, alternative embodiments of mobile drive unit 120 and inventory holder 130 may be configured to dock in any manner suitable to allow mobile drive unit 120 to move inventory holder 130 within workspace 170. Additionally, as noted below, in particular embodiments, mobile drive units 120 represent all or portions of inventory holders 130. In such embodiments, mobile drive units 120 may not dock with inventory holders 130 before transporting inventory holders 130 and/or mobile drive units 120 may each remain continually docked with a particular inventory holder 130.

While the appropriate components of inventory system 110 complete assigned tasks, management module 115 may interact with the relevant components to ensure the efficient use of space, equipment, manpower, and other resources available to inventory system 110. As one specific example of such interaction, management module 115 is responsible, in particular embodiments, for planning the paths mobile drive units 120 take when moving within workspace 170 and for allocating use of a particular portion of workspace 170 to a particular mobile drive unit 120 for purposes of completing an assigned task. In such embodiments, mobile drive units 120 may, in response to being assigned a task, request a path to a particular destination associated with the task. Moreover, while the description below focuses on one or more embodiments in which mobile drive unit 120 requests paths from management module 115, mobile drive unit 120 may, in alternative embodiments, generate its own paths.

Components of inventory system 110 may provide information to management module 115 regarding their current state, other components of inventory system 110 with which they are interacting, and/or other conditions relevant to the operation of inventory system 110. This may allow management module 115 to utilize feedback from the relevant components to update algorithm parameters, adjust policies, or otherwise modify its decision-making to respond to changes in operating conditions or the occurrence of particular events.

In addition, while management module 115 may be configured to manage various aspects of the operation of the components of inventory system 110, in particular embodiments, the components themselves may also be responsible for decision-making relating to certain aspects of their operation, thereby reducing the processing load on management module 115.

Thus, based on its knowledge of the location, current state, and/or other characteristics of the various components of inventory system 110 and an awareness of all the tasks currently being completed, management module 115 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 110 may be able to support a number of techniques for efficiently executing various aspects of the operation of inventory system 110. As a result, particular embodiments of management module 115 may, by implementing one or more management techniques described below, enhance the efficiency of inventory system 110 and/or provide other operational benefits.

Figure 9:
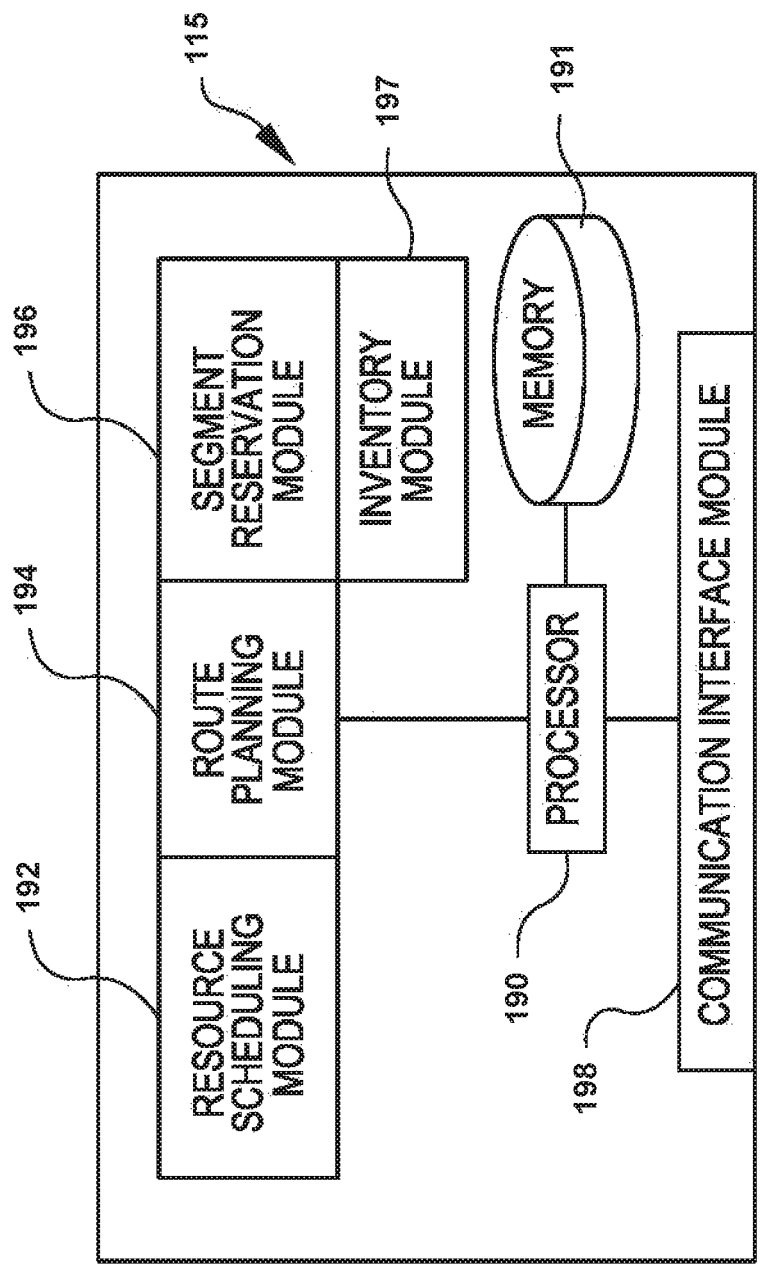
FIG. 9 illustrates components of an example management module that can be employed in the inventory system shown in FIG. 8.

FIG. 9 illustrates in greater detail the components of a particular embodiment of management module 115. As shown, the example embodiment includes a resource scheduling module 192, a route planning module 194, a segment reservation module 196, an inventory module 197, a communication interface module 198, a processor 190, and a memory 191. Management module 115 may represent a single component, multiple components located at a central location within inventory system 110, or multiple components distributed throughout inventory system 110. For example, management module 115 may represent components of one or more mobile drive units 120 that are capable of communicating information between the mobile drive units 120 and coordinating the movement of mobile drive units 120 within workspace 170. In general, management module 115 may include any appropriate combination of hardware and/or software suitable to provide the described functionality.

Processor 190 is operable to execute instructions associated with the functionality provided by management module 115. Processor 190 may comprise one or more general purpose computers, dedicated microprocessors, or other processing devices capable of communicating electronic information. Examples of processor 190 include one or more application-specific integrated circuits (ASICs), field programmable gate arrays (FPGAs), digital signal processors (DSPs) and any other suitable specific or general purpose processors.

Memory 191 stores processor instructions, inventory requests, reservation information, state information for the various components of inventory system 110 and/or any other appropriate values, parameters, or information utilized by management module 115 during operation. Memory 191 may represent any collection and arrangement of volatile or nonvolatile, local or remote devices suitable for storing data. Examples of memory 191 include, but are not limited to, random access memory (RAM) devices, read only memory (ROM) devices, magnetic storage devices, optical storage devices, or any other suitable data storage devices.

Resource scheduling module 192 processes received inventory requests and generates one or more assigned tasks to be completed by the components of inventory system 110. Resource scheduling module 192 may also select one or more appropriate components for completing the assigned tasks and, using communication interface module 198, communicate the assigned tasks to the relevant components. Additionally, resource scheduling module 192 may also be responsible for generating assigned tasks associated with various management operations, such as prompting mobile drive units 120 to recharge batteries or have batteries replaced, instructing inactive mobile drive units 120 to park in a location outside the anticipated traffic flow or a location near the anticipated site of future tasks, and/or directing mobile drive units 120 selected for repair or maintenance to move towards a designated maintenance station.

Route planning module 194 receives route requests from mobile drive units 120. These route requests identify one or more destinations associated with a task the requesting mobile drive unit 120 is executing. In response to receiving a route request, route planning module 194 generates a path to one or more destinations identified in the route request. Route planning module 194 may implement any appropriate algorithms utilizing any appropriate parameters, factors, and/or considerations to determine the appropriate path. After generating an appropriate path, route planning module 194 transmits a route response identifying the generated path to the requesting mobile drive unit 120 using communication interface module 198.

Segment reservation module 196 receives reservation requests from mobile drive units 120 attempting to move along paths generated by route planning module 194. These reservation requests request the use of a particular portion of workspace 170 (referred to herein as a "segment") to allow the requesting mobile drive unit 120 to avoid collisions with other mobile drive units 120 while moving across the reserved segment. In response to received reservation requests, segment reservation module 196 transmits a reservation response granting or denying the reservation request to the requesting mobile drive unit 120 using the communication interface module 198.

The inventory module 197 maintains information about the location and number of inventory items in the inventory system 110. Information can be maintained about the number of inventory items in a particular inventory holder 130, and the maintained information can include the location of those inventory items in the inventory holder 130. The inventory module 197 can also communicate with the mobile drive units 120, utilizing task assignments 118 to maintain, replenish, or move inventory items within the inventory system 110.

Communication interface module 198 facilitates communication between management module 115 and other components of inventory system 110, including reservation responses, reservation requests, route requests, route responses, and task assignments. These reservation responses, reservation requests, route requests, route responses, and task assignments may represent communication of any form appropriate based on the capabilities of management module 115 and may include any suitable information. Depending on the configuration of management module 115, communication interface module 198 may be responsible for facilitating either or both of wired and wireless communication between management module 115 and the various components of inventory system 110. In particular embodiments, management module 115 may communicate using communication protocols such as 802.11, Bluetooth, or Infrared Data Association (IrDA) standards. Furthermore, management module 115 may, in particular embodiments, represent a portion of mobile drive unit 120 or other components of inventory system 110. In such embodiments, communication interface module 198 may facilitate communication between management module 115 and other parts of the same system component.

In general, resource scheduling module 192, route planning module 194, segment reservation module 196, inventory module 197, and communication interface module 198 may each represent any appropriate hardware and/or software suitable to provide the described functionality. In addition, as noted above, management module 115 may, in particular embodiments, represent multiple different discrete components and any or all of resource scheduling module 192, route planning module 194, segment reservation module 196, inventory module 197, and communication interface module 198 may represent components physically separate from the remaining elements of management module 115. Moreover, any two or more of resource scheduling module 192, route planning module 194, segment reservation module 196, inventory module 197, and communication interface module 198 may share common components. For example, in particular embodiments, resource scheduling module 192, route planning module 194, segment reservation module 196, and inventory module 197 represent computer processes executing on processor 190 and communication interface module 198 comprises a wireless transmitter, a wireless receiver, and a related computer process executing on processor 190.

Figure 10:
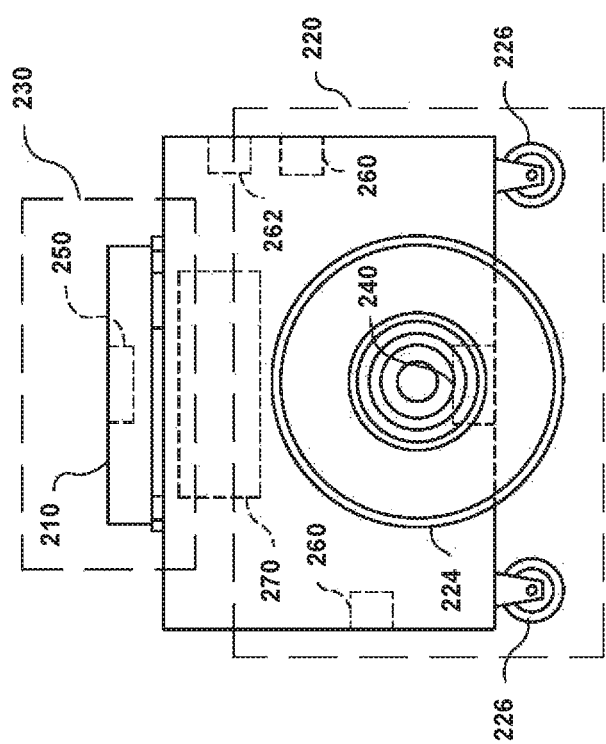
FIGS. 10 and 11 illustrate an example mobile drive unit that can be employed in the inventory system shown in FIG. 8.
Figure 11:
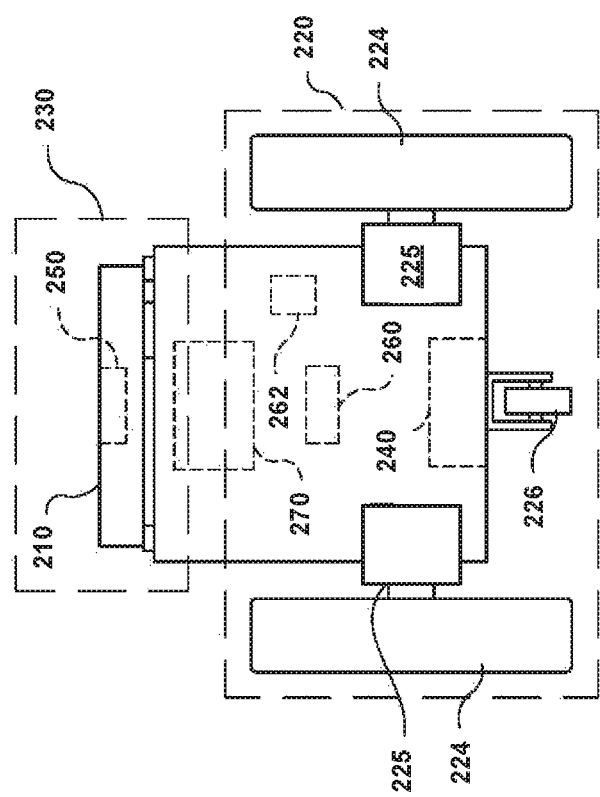
Figure 12:
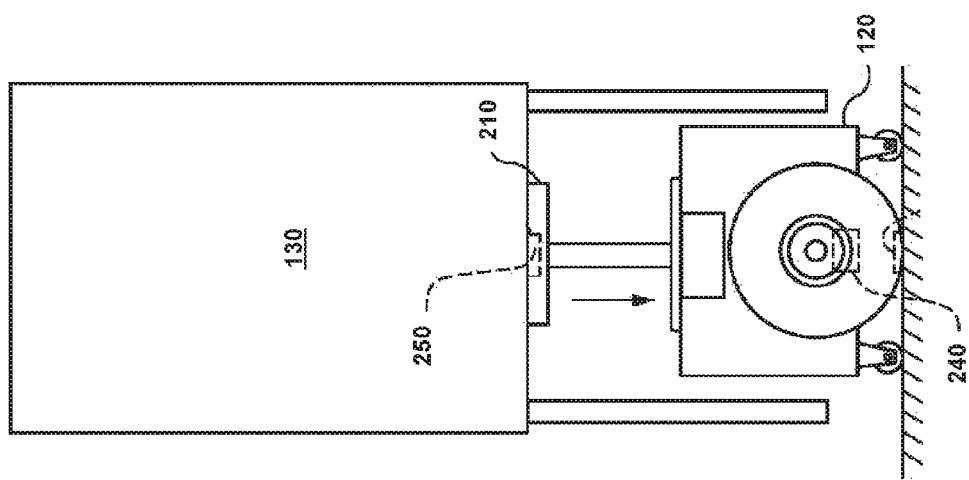
FIG. 12 illustrates an example inventory holder that can be utilized in the inventory system shown in FIG. 8.

FIGS. 10 through 12 illustrate in greater detail the components of a particular embodiment of mobile drive unit 120. In particular, FIGS. 10 through 12 include a front and side view of an example mobile drive unit 120. Mobile drive unit 120 includes a docking head 210, a drive module 220, a docking actuator 230, and a control module 270. Additionally, mobile drive unit 120 may include one or more sensors configured to detect or determine the location of mobile drive unit 120, inventory holder 130, and/or other appropriate elements of inventory system 110. In the illustrated embodiment, mobile drive unit 120 includes a position sensor 240, a holder sensor 250, an obstacle sensor 260, and an identification signal transmitter 262.

Docking head 210, in particular embodiments of mobile drive unit 120, couples mobile drive unit 120 to inventory holder 130 and/or supports inventory holder 130 when mobile drive unit 120 is docked to inventory holder 130. Docking head 210 may additionally allow mobile drive unit 120 to maneuver inventory holder 130, such as by lifting inventory holder 130, propelling inventory holder 130, rotating inventory holder 130, and/or moving inventory holder 130 in any other appropriate manner. Docking head 210 may also include any appropriate combination of components, such as ribs, spikes, and/or corrugations, to facilitate such manipulation of inventory holder 130. For example, in particular embodiments, docking head 210 may include a high-friction portion that abuts a portion of inventory holder 130 while mobile drive unit 120 is docked to inventory holder 130. In such embodiments, frictional forces created between the high-friction portion of docking head 210 and a surface of inventory holder 130 may induce translational and rotational movement in inventory holder 130 when docking head 210 moves and rotates, respectively. As a result, mobile drive unit 120 may be able to manipulate inventory holder 130 by moving or rotating docking head 210, either independently or as a part of the movement of mobile drive unit 120 as a whole.

Drive module 220 propels mobile drive unit 120 and, when mobile drive unit 120 and inventory holder 130 are docked, inventory holder 130. Drive module 220 may represent any appropriate collection of components operable to propel mobile drive unit 120. For example, in the illustrated embodiment, drive module 220 includes a pair of motorized wheels 224, and a pair of stabilizing wheels 226. One motorized wheel 224 is located on each side of the mobile drive unit 120, and one stabilizing wheel 226 is positioned at each end of mobile drive unit 120. Each of the motorized wheels 224 is driven via an associated drive unit 225.

Docking actuator 230 moves docking head 210 towards inventory holder 130 to facilitate docking of mobile drive unit 120 and inventory holder 130. Docking actuator 230 may also be capable of adjusting the position or orientation of docking head 210 in other suitable manners to facilitate docking. Docking actuator 230 may include any appropriate components, based on the configuration of mobile drive unit 120 and inventory holder 130, for moving docking head 210 or otherwise adjusting the position or orientation of docking head 210. For example, in the illustrated embodiment, docking actuator 230 includes a motorized shaft (not shown) attached to the center of docking head 210. The motorized shaft is operable to lift docking head 210 as appropriate for docking with inventory holder 130.

Drive module 220 may be configured to propel mobile drive unit 120 in any appropriate manner. For example, in the illustrated embodiment, motorized wheels 224 are operable to rotate in a first direction to propel mobile drive unit 120 in a forward direction. Motorized wheels 224 are also operable to rotate in a second direction to propel mobile drive unit 120 in a backward direction. In the illustrated embodiment, drive module 220 is also configured to rotate mobile drive unit 120 by rotating motorized wheels 224 in different directions from one another or by rotating motorized wheels 224 at different speed from one another.

Position sensor 240 represents one or more sensors, detectors, or other components suitable for determining the location of mobile drive unit 120 in any appropriate manner. For example, in particular embodiments, the workspace 170 associated with inventory system 110 includes a number of fiducial marks that mark points on a two-dimensional grid that covers all or a portion of workspace 170. In such embodiments, position sensor 240 may include a camera and suitable image- and/or video-processing components, such as an appropriately-programmed digital signal processor, to allow position sensor 240 to detect fiducial marks within the camera's field of view. Control module 270 may store location information that position sensor 240 updates as position sensor 240 detects fiducial marks. As a result, position sensor 240 may utilize fiducial marks to maintain an accurate indication of the location mobile drive unit 120 and to aid in navigation when moving within workspace 170.

Holder sensor 250 represents one or more sensors, detectors, or other components suitable for detecting inventory holder 130 and/or determining, in any appropriate manner, the location of inventory holder 130, as an absolute location or as a position relative to mobile drive unit 120. Holder sensor 250 may be capable of detecting the location of a particular portion of inventory holder 130 or inventory holder 130 as a whole. Mobile drive unit 120 may then use the detected information for docking with or otherwise interacting with inventory holder 130.

Obstacle sensor 260 represents one or more sensors capable of detecting objects located in one or more different directions in which mobile drive unit 120 is capable of moving. Obstacle sensor 260 may utilize any appropriate components and techniques, including optical, radar, sonar, pressure-sensing and/or other types of detection devices appropriate to detect objects located in the direction of travel of mobile drive unit 120. In particular embodiments, obstacle sensor 260 may transmit information describing objects it detects to control module 270 to be used by control module 270 to identify obstacles and to take appropriate remedial actions to prevent mobile drive unit 120 from colliding with obstacles and/or other objects.

Obstacle sensor 260 may also detect signals transmitted by other mobile drive units 120 operating in the vicinity of the illustrated mobile drive unit 120. For example, in particular embodiments of inventory system 110, one or more mobile drive units 120 may include an identification signal transmitter 262 that transmits a drive identification signal. The drive identification signal indicates to other mobile drive units 120 that the object transmitting the drive identification signal is in fact a mobile drive unit. Identification signal transmitter 262 may be capable of transmitting infrared, ultraviolet, audio, visible light, radio, and/or other suitable signals that indicate to recipients that the transmitting device is a mobile drive unit 120.

Additionally, in particular embodiments, obstacle sensor 260 may also be capable of detecting state information transmitted by other mobile drive units 120. For example, in particular embodiments, identification signal transmitter 262 may be capable of including state information relating to mobile drive unit 120 in the transmitted identification signal. This state information may include, but is not limited to, the position, velocity, direction, and the braking capabilities of the transmitting mobile drive unit 120. In particular embodiments, mobile drive unit 120 may use the state information transmitted by other mobile drive units to avoid collisions when operating in close proximity with those other mobile drive units.

Control module 270 monitors and/or controls operation of drive module 220 and docking actuator 230. Control module 270 may also receive information from sensors such as position sensor 240 and holder sensor 250 and adjust the operation of drive module 220, docking actuator 230, and/or other components of mobile drive unit 120 based on this information. Additionally, in particular embodiments, mobile drive unit 120 may be configured to communicate with a management device of inventory system 110 and control module 270 may receive commands transmitted to mobile drive unit 120 and communicate information back to the management device utilizing appropriate communication components of mobile drive unit 120. Control module 270 may include any appropriate hardware and/or software suitable to provide the described functionality. In particular embodiments, control module 270 includes a general-purpose microprocessor programmed to provide the described functionality. Additionally, control module 270 may include all or portions of docking actuator 230, drive module 220, position sensor 240, and/or holder sensor 250, and/or share components with any of these elements of mobile drive unit 120.

Moreover, in particular embodiments, control module 270 may include hardware and software located in components that are physically distinct from the device that houses drive module 220, docking actuator 230, and/or the other components of mobile drive unit 120 described above. For example, in particular embodiments, each mobile drive unit 120 operating in inventory system 110 may be associated with a software process (referred to here as a "drive agent")

operating on a server that is in communication with the device that houses drive module 220, docking actuator 230, and other appropriate components of mobile drive unit 120. This drive agent may be responsible for requesting and receiving tasks, requesting and receiving routes, transmitting state information associated with mobile drive unit 120, and/or otherwise interacting with management module 115 and other components of inventory system 110 on behalf of the device that physically houses drive module 220, docking actuator 230, and the other appropriate components of mobile drive unit 120. As a result, for the purposes of this description and the claims that follow, the term "mobile drive unit" includes software and/or hardware, such as agent processes, that provides the described functionality on behalf of mobile drive unit 120 but that may be located in physically distinct devices from the drive module 220, docking actuator 230, and/or the other components of mobile drive unit 120 described above.

While FIGS. 10 through 12 illustrate a particular embodiment of mobile drive unit 120 containing certain components and configured to operate in a particular manner, mobile drive unit 120 may represent any appropriate component and/or collection of components configured to transport and/or facilitate the transport of inventory holders 130. As another example, mobile drive unit 120 may represent part of an overhead crane system in which one or more crane assemblies are capable of moving within a network of wires or rails to a position suitable to dock with a particular inventory holder 130. After docking with inventory holder 130, the crane assembly may then lift inventory holder 130 and move inventory to another location for purposes of completing an assigned task.

Figure 13:
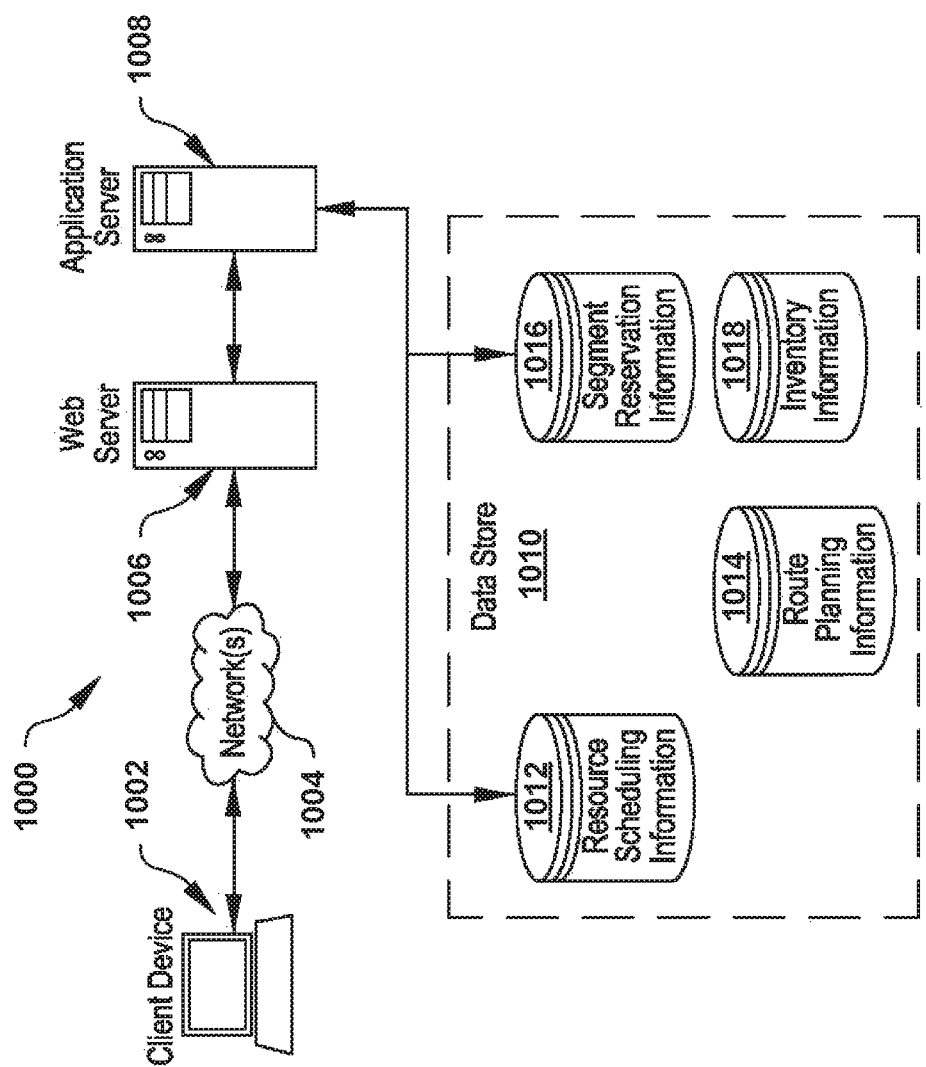
FIG. 13 illustrates an environment in which various embodiments can be implemented.

FIG. 13 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of Hypertext Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store 1010 can include inventory information 1018, for example, including identification of items stored in the inventory system and identification of the storage location for each of the respective inventory items. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1000 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory management system, comprising:
    an inventory holder including inventory bins configured to store inventory items;
    an ultrasonic unit configured to be worn by a user in proximity to the user's hand, the ultrasonic unit comprising an ultrasonic pulse transmitter and a control unit operatively coupled with the ultrasonic pulse transmitter, the ultrasonic unit being configured to emit periodic ultrasonic sound pulses via the ultrasonic pulse transmitter;
    four ultrasonic transducers arranged relative to the inventory holder, each of the four ultrasonic transducers being configured to generate a respective electrical signal in response to reception of the periodic ultrasonic pulses emitted by the ultrasonic pulse transmitter;
    a management module operatively coupled with the four ultrasonic transducers and configured to process the respective signals generated by the four ultrasonic transducers to track location of the ultrasonic unit and identify one of the inventory bins based on proximity of the ultrasonic unit to the identified inventory bin, the management module being further configured to compare the identified inventory bin with a designated inventory bin of the inventory bins to monitor performance of an inventory task assigned to the user, the inventory task assigned to the user being one of retrieving an inventory item from the designated inventory bin or placing an inventory item into the designated inventory bin; and
    at least one of:
        an infra-red light emitting diode disposed relative to the four ultrasonic transducers, and wherein the ultrasonic unit comprises a photo cell operatively coupled with the control unit, the control unit being configured to begin output of a periodic electrical signal to the ultrasonic pulse transmitter for conversion into the periodic ultrasonic pulses in response to a signal from the photo cell generated in response to reception by the photo cell of infra-red light emitted by the infra-red light emitting diode; and
        a near-field radiofrequency (RF) transmitter disposed relative to the four ultrasonic transducers, and wherein the ultrasonic unit comprises an RF receiver operatively coupled with the control unit, the control unit being configured to begin output of a periodic electrical signal to the ultrasonic pulse transmitter for conversion into the periodic ultrasonic pulses in response to reception by the RF receiver of an RF transmission by the near-field RF transmitter.

2. The inventory management system of claim 1, wherein the four ultrasonic transducers are mounted independently of the inventory holder and the inventory management system further comprises a mobile drive unit configured to transport the inventory holder within an inventory facility, the inventory management system being configured to control the mobile drive unit to controllably position the inventory holder relative to the four ultrasonic transducers.

3. The inventory management system of claim 1, wherein the ultrasonic unit includes a haptic feedback mechanism configured to generate a haptic feedback to the user indicative of at least one of the identified inventory bin matching the designated inventory bin or the identified inventory bin not matching the designated inventory bin, the management module controlling operation of the haptic feedback mechanism via a control signal transmitted to the ultrasonic unit.

4. The inventory management system of claim 1, comprising the infra-red light emitting diode disposed relative to the four ultrasonic transducers, and wherein the ultrasonic unit comprises the photo cell operatively coupled with the control unit, the control unit being configured to begin output of the periodic electrical signal to the ultrasonic pulse transmitter for conversion into the periodic ultrasonic pulses in response to the signal from the photo cell generated in response to reception by the photo cell of infra-red light emitted by the infra-red light emitting diode.

5. The inventory management system of claim 1, comprising the near-field radiofrequency (RF) transmitter disposed relative to the four ultrasonic transducers, and wherein the ultrasonic unit comprises the RF receiver operatively coupled with the control unit, the control unit being configured to begin output of the periodic electrical signal to the ultrasonic pulse transmitter for conversion into the periodic ultrasonic pulses in response to reception by the RF receiver of an RF transmission by the near-field RF transmitter.

6. The inventory management system of claim 1, wherein the ultrasonic pulse transmitter includes a plurality of ultrasonic pulse transmitters distributed on the ultrasonic unit, at least some of the plurality of ultrasonic pulse transmitters configured to directly emit the periodic ultrasonic pulses toward each of the four ultrasonic transducers.

7. A system, comprising:
an ultrasonic unit configured to be worn by a user in proximity to the user's hand and configured to emit periodic ultrasonic sound pulses;
ultrasonic transducers arranged relative to locations configured to store items; and
a management module operatively coupled with the ultrasonic transducers and configured to process signals generated by the ultrasonic transducers to identify one of the locations based on proximity of the ultrasonic unit relative to the identified location, the management module being further configured to monitor performance of a task based on the identified location,
wherein the ultrasonic unit is configured to transmit data to the management module by embedding the data in the periodic ultrasonic pulses, the embedded data being indicative of at least one of an identification of the user, whether the user's hand is the user's left hand or right hand, a charge state of the ultrasonic unit, a timestamp associated with an ultrasonic pulse, an operational status of the ultrasonic unit or a duration of use of the ultrasonic unit.

8. The system of claim 7, wherein the ultrasonic transducers are mounted independently of an inventory holder comprising the locations and the system further comprises a mobile drive unit configured to transport the inventory holder within a facility, the system being configured to control the mobile drive unit to controllably position the inventory holder relative to the ultrasonic transducers.

9. The system of claim 8, wherein the management module is configured to determine a positional relationship between the locations and the ultrasonic transducers in response to a calibration process in which the user's hand is moved to designated positions relative to the locations.

10. The system of claim 7, wherein the ultrasonic unit includes a haptic feedback mechanism configured to generate a haptic feedback to the user indicative of at least one of the identified location matching a designated location or the identified location not matching the designated location, the management module controlling operation of the haptic feedback mechanism via a control signal transmitted to the ultrasonic unit.

11. The system of claim 7, further comprising a proximity signal emitter that emits a proximity signal and is disposed relative to the ultrasonic transducers, and wherein the ultrasonic unit comprises a proximity signal receiver and is configured to begin output of the periodic ultrasonic pulses in response to reception of the proximity signal by the proximity signal receiver.

12. The system of claim 7, wherein the ultrasonic unit comprises a plurality of ultrasonic pulse transmitters configured to emit the periodic ultrasonic pulses and distributed on the ultrasonic unit, at least some of the plurality of ultrasonic transmitters configured to directly emit the periodic ultrasonic pulses toward each of the ultrasonic transducers.

13. The system of claim 7, wherein:
the periodic ultrasound pulses are configured to enable identification of the user; and
the ultrasonic unit is configurable to modify the periodic ultrasound pulses to enable identification of the user.

14. A computer implemented method, comprising:
receiving, via ultrasonic transducers, periodic ultrasonic sound pulses emitted by an ultrasonic unit worn by a user in proximity to the user's hand;
generating signals indicative of arrival times of the periodic ultrasonic sound pulses at respective ultrasonic transducers;
processing the signals, by a management module, to track a location of the ultrasonic unit relative to a plurality of locations configured to store items;
identifying, by the management module, a location of the plurality of locations based on proximity of the ultrasonic unit relative to the identified location;
monitoring, by the management module, performance of a task based on the identified location; and
receiving data, by the management module, from the ultrasonic unit, the data being indicative of at least one of an identification of the user, whether the user's hand is the user's left hand or right hand, a charge state of the ultrasonic unit, a timestamp associated with the ultrasonic pulse, an operational status of the ultrasonic unit or a duration of use of the ultrasonic unit.

15. The computer implemented method of claim 14, comprising:
transmitting a signal indicative of whether the identified location matches a designated location; and
instructing operation of a haptic feedback mechanism of the ultrasonic unit to communicate to the user whether the identified location matches the designated location.

16. The computer implemented method of claim 14, comprising:
transmitting a signal indicative of proximity of the ultrasonic unit to the plurality of locations; and
instructing emitting of the periodic ultrasonic sound pulses by the ultrasonic unit based on the proximity of the ultrasonic unit to the plurality of locations.

17. The computer implemented method of claim 14, further comprising processing, by the management module, the signals to identify the user among a plurality of users.

18. The computer implemented method of claim 14, further comprising instructing configuring of the ultrasonic unit to emit the periodic ultrasonic pulses at a particular frequency.

* * * * *